US005637049A

United States Patent [19]
Zentmyer et al.

[11] Patent Number: 5,637,049
[45] Date of Patent: Jun. 10, 1997

[54] LOCKING DIFFERENTIAL

[75] Inventors: John H. Zentmyer, Taluca Lake; Mark V. Tyson, Balboa Island, both of Calif.

[73] Assignee: Vehicular Technologies, Inc., Costa Mesa, Calif.

[21] Appl. No.: 547,239

[22] Filed: Oct. 24, 1995

[51] Int. Cl.$^6$ .................................................. F16H 48/24
[52] U.S. Cl. ........................................ 475/231; 192/49
[58] Field of Search .................................. 475/150, 231, 475/234, 235, 236, 237, 240, 241; 192/49

[56] References Cited

U.S. PATENT DOCUMENTS

| | | | |
|---|---|---|---|
| 2,855,806 | 10/1958 | Fallon | 475/234 |
| 3,131,578 | 5/1964 | Elliott | 475/231 |
| 3,133,454 | 5/1964 | Padlo | 475/150 |
| 4,104,931 | 8/1978 | Tomich | 74/650 |
| 4,159,656 | 7/1979 | Tomich | 74/650 |
| 4,424,725 | 1/1984 | Bawks | 74/650 |
| 4,493,227 | 1/1985 | Schmid | 475/89 |
| 4,566,566 | 1/1986 | Vuillet | 192/24 |
| 4,597,312 | 7/1986 | Hicks et al. | 475/204 |
| 4,621,540 | 11/1986 | Davison | 475/665 T |
| 4,759,232 | 7/1988 | Roberts | 475/86 |
| 4,974,471 | 12/1990 | McGarraugh | 475/24 |
| 5,031,740 | 7/1991 | Deichstetter et al. | 192/24 |
| 5,067,601 | 11/1991 | Castens | 192/65 |
| 5,098,360 | 3/1992 | Hirota | 475/231 |
| 5,176,590 | 1/1993 | Haydock | 475/249 |
| 5,186,694 | 2/1993 | Cooper | 475/230 |
| 5,342,255 | 8/1994 | Slesinski et al. | 475/231 |
| 5,386,742 | 2/1995 | Irikura et al. | 74/665 F |
| 5,394,764 | 3/1995 | Fini, Jr. | 74/378 |
| 5,413,015 | 5/1995 | Zentmyer | 74/650 |

Primary Examiner—Andrea L. Pitts
Assistant Examiner—Sherry Lynn Estremsky
Attorney, Agent, or Firm—Knobbe, Martens, Olson & Bear, LLP.

[57] ABSTRACT

A locking differential is provided for selectably locking a first axle to a second axle. The locking differential utilizes a dog clutch assembly characterized by two interlocking clutch members positioned between the differential side gears on opposing sides of the differential pinion shaft. The interlocking clutch members have face splines thereon for engaging corresponding face splines formed on the side gears. An actuating mechanism can be selectably activated to force the two interlocking members into engagement with the side gears.

24 Claims, 16 Drawing Sheets

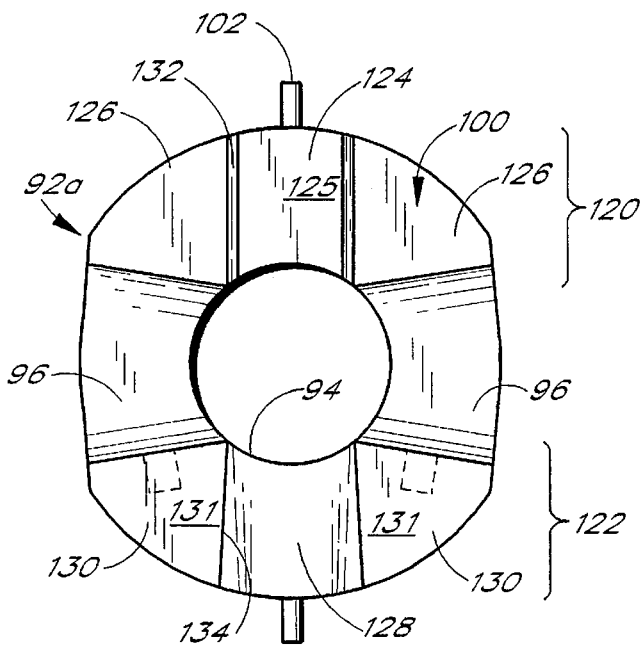
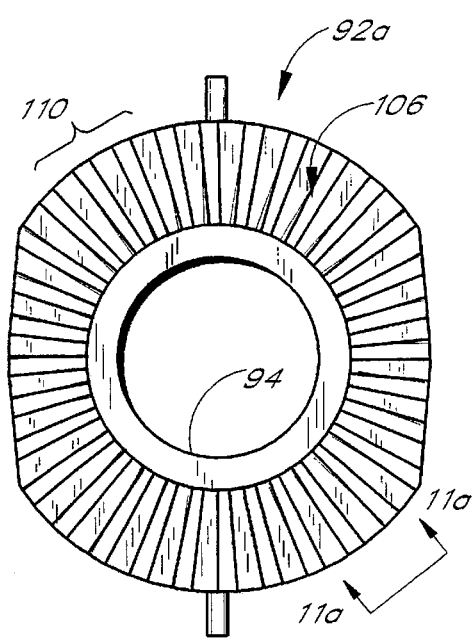
FIG. 10  FIG. 11
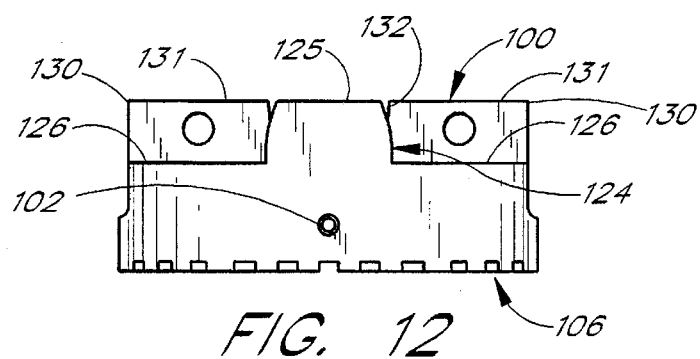
FIG. 12
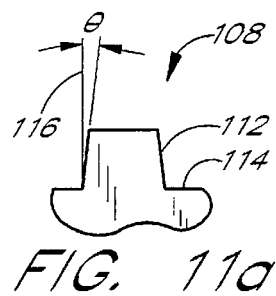
FIG. 11a
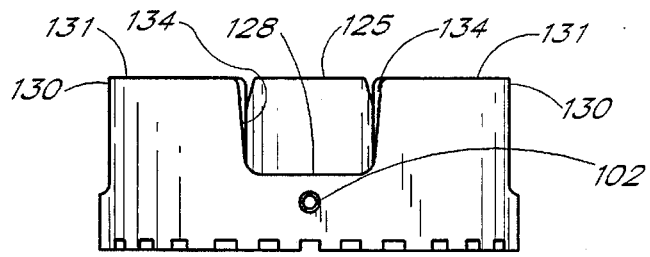
FIG. 13
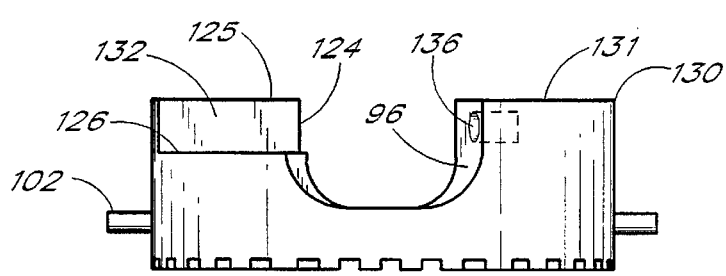
FIG. 14

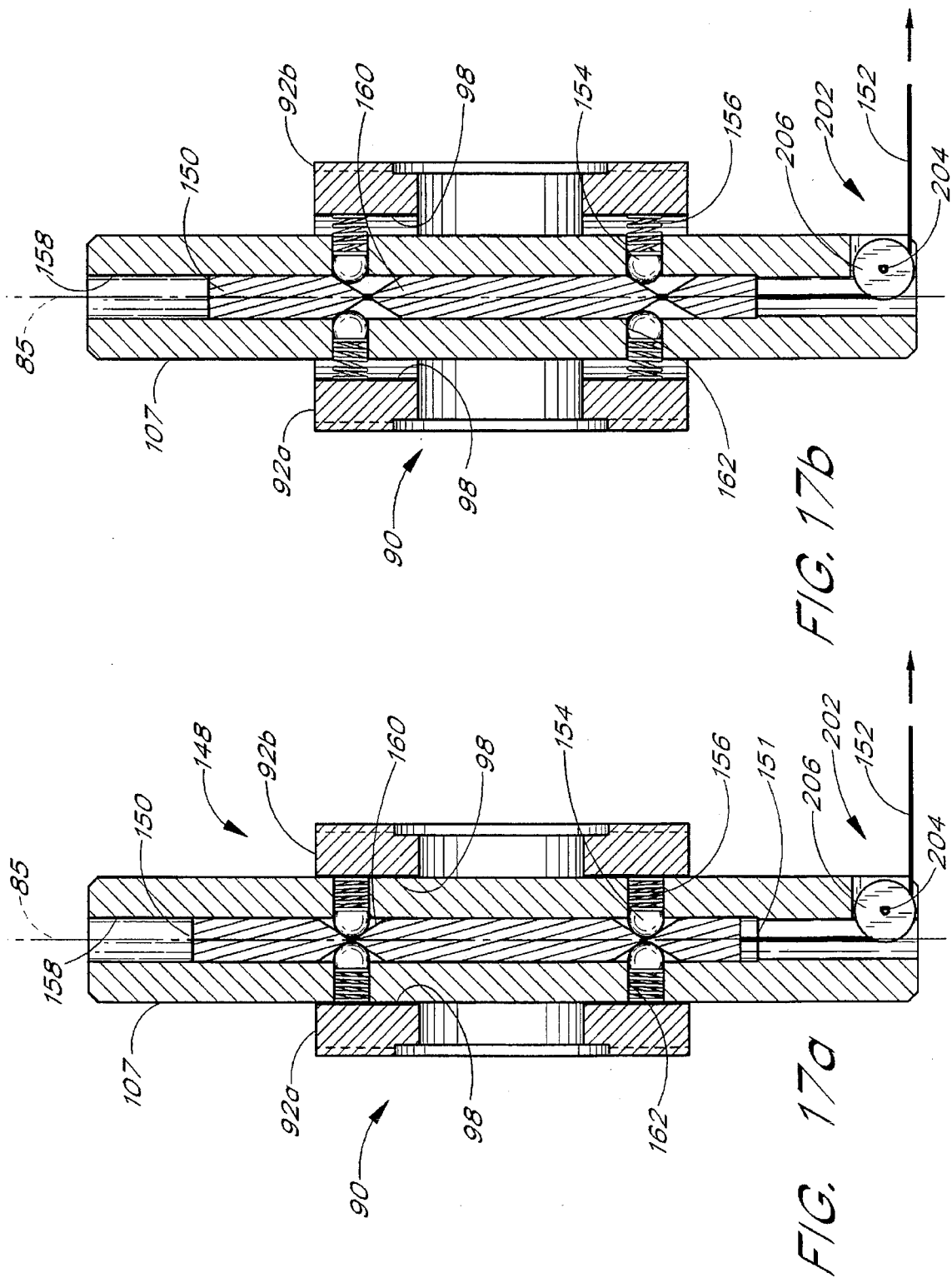

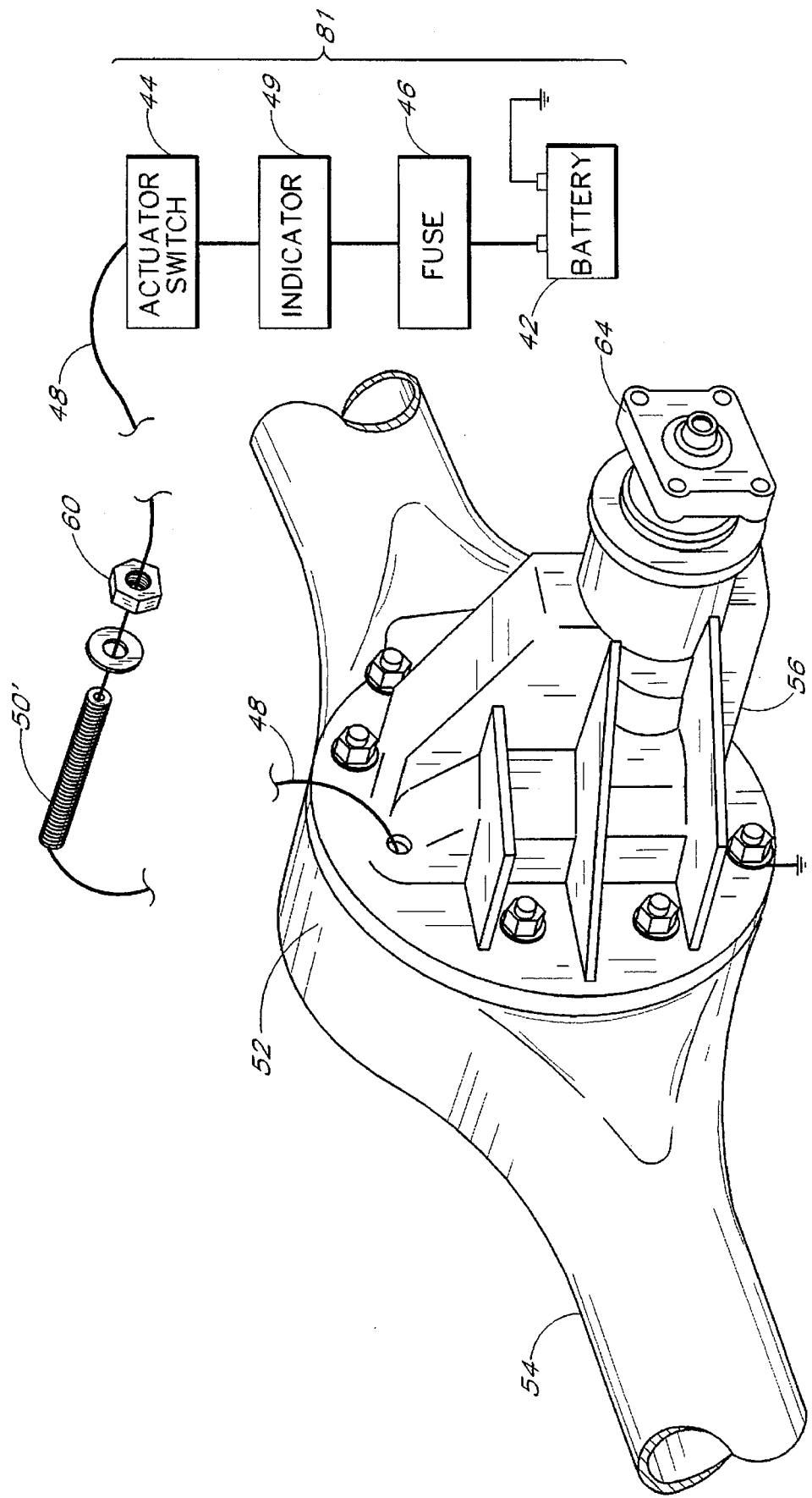

LOCKING DIFFERENTIAL

FIELD OF THE INVENTION

This invention relates to locking differentials for motor vehicles and the like and, more particularly, to a selectable locking differential for passenger, high-performance or off-highway vehicles which can be retrofitted into an existing automotive differential casing and which can be actuated via a remotely controlled actuator.

BACKGROUND OF THE INVENTION

In a conventional automotive drive train, power is distributed from a centrally located power plant or engine to one or more drive wheels which propel the vehicle in a desired direction. Early automotive drive trains and some modern drive trains, such as for farm and certain industrial uses, deliver power to a single rear drive wheel though a simple clutch and chain-drive system. While this design provides a relatively simple and inexpensive drive train, it suffers from several well-noted drawbacks which make it unsuited for general vehicular use.

The most salient drawback is the limited drive traction or acceleration force available from a single driving wheel. Those skilled in the art will readily appreciate that the maximum acceleration force exerted on a vehicle is limited by the traction force or friction force produced by the driving wheel(s) in contact with the road surface. Once the static friction of the driving wheel on the road surface is overcome, the wheel begins to slip and any further power delivered to the wheel is dissipated in the form of heat energy rather than as an acceleration force exerted on the vehicle. If the drive wheel gets stuck in mud or ice, the vehicle becomes disabled. For a multi-wheeled vehicle, therefore, it is desirable to deliver power to as many wheels as possible in order to maximize traction and vehicle acceleration.

A more subtle drawback is the imbalance of torque created by the exertion of a driving force on one rear wheel, but not the other. As power is delivered to the drive wheel during vehicle acceleration, an imbalance is created which causes the vehicle to veer or swerve in a direction away from the driven wheel. Conversely, when the drive wheel imparts a deceleration force the vehicle will have a tendency to veer or swerve toward the driven wheel. This causes undesirable vehicle handling performance.

To balance the acceleration and deceleration forces imparted to a conventional four-wheeled vehicle, it is desirable to distribute driving power over at least the front two wheels (front-wheel drive) or rear two wheels (rear-wheel drive) of a vehicle. This balances the acceleration and deceleration forces exerted on the vehicle and also increases drive traction. For off-highway driving or driving on wet or icy pavement it may be desirable to distribute power to all four wheels (four-wheel drive) in order to provide maximum traction under these driving conditions.

Modern vehicular gear trains provide balanced power distribution via a differential gear assembly disposed between the left and right axles of a driven pair of wheels (font and/or rear). A conventional automotive differential consists of a pair of opposed beveled side gears secured to the inboard side of each half-axle and engaging a centrally disposed pair of pinion gears mounted on a common pinion shaft. The pinion shaft is rotated about its transverse axis so as to apply equal forces to each side gear, delivering balanced power to the drive wheels. During vehicle cornering or turning the pinion gears allow the side gears to rotate relative to one another or "differentiate" so as to accommodate a relatively higher rotational speed of the outer drive wheel and a relatively lower rotational speed of the inner drive wheel.

Most modern vehicle drive trains utilize a conventional "open" differential. An open differential always divides torque equally between the opposing drive wheels. This provides optimal power delivery to the wheels under most driving conditions. However, if one wheel loses traction and starts spinning with only a small amount of torque applied, the other wheel also receives only this same small amount of torque such that the vehicle could easily become disabled. This problem is particularly acute when driving in muddy off-highway conditions or on wet or icy pavement. While an open differential divides torque equally between the drive wheels, maximum available torque is determined by the wheel having the least resistance to turning, which is undesirable.

Designers of certain high-performance racing vehicles have long attempted to overcome this problem by providing a "solid" rear axle such that both rear wheels are coupled together and driven in unison. A solid axle allows the torque on one wheel to be maintained regardless of the level of torque exerted on the other wheel. Unlike an open differential, a solid axle has the desirable and advantageous characteristic that maximum available torque is determined by the drive wheel having the most traction such that adequate driving traction can be maintained even if one wheel slips.

While solid axles are highly desirable under certain driving conditions such as for off-highway or high-performance automotive racing where a high degree of traction is required, they can present several undesirable drawbacks under most normal driving conditions. In particular, a solid axle provides no differentiation between the outer and inner drive wheels during cornering. This can cause, among other things, severe under-steering of the vehicle, undesirable scuffing of the tires and uneven tire wear as the wheels are forced to maintain uniform rolling speed even during cornering maneuvers. A solid axle can also strain the vehicle suspension system since the axle will resist turning during cornering. These drawbacks make solid axles generally unsuited for most vehicular uses.

Many attempts have been made to design a hybrid vehicular differential which combines the traction enhancing advantages of a solid axle with the balanced power delivery and differentiating capability of a conventional open differential. Two basic types of hybrid differentials have been proposed—"limited slip" differentials and "locking" differentials. Limited slip differentials generally utilize a friction plate or slip plate to transmit a portion of the torque from a slipping wheel to a non-slipping wheel. Limited slip differentials do not provide the full traction power attained using a solid axle, however, because only a portion of the available torque can be transmitted to the non-slipping wheel while still allowing for adequate differentiation under normal driving conditions. Also, limited slip differentials are not 100% energy efficient since a portion of the available power is typically dissipated as heat energy in the friction plate.

Locking differentials, on the other hand, utilize a releasable locking mechanism to deliver 100% power to both wheels during straight-away driving, but release one wheel during cornering maneuvers so that a differential function is achieved. See, for instance my U.S. Pat. No. 5,413,015, incorporated herein by reference. Locking differentials provide significant traction and performance advantages over conventional solid axle or open differentials. One particularly popular locking differential product is available from PowerTrax™ of Costa Mesa, Calif. under the trademark Lock-Right™.

The Lock-Right locking differential consists of two bidirectional clutches which replace the pinion gears and side gears of a conventional open differential. Each clutch has a driving member or "driver" and a driven member or "coupler." The driver mates with its coupler to form a fully locking clutch combination. When the vehicle is moving straight ahead, both wheels rotate at the same speed and both clutches are fully engaged. On the other hand, when the vehicle begins to turn, the outside wheel starts to overrun the inside wheel. This causes the outside clutch to ratchet, allowing the wheel to rotate freely as power is diverted to the slower moving inside wheel. As the vehicle straightens out, the wheels again rotate at the same speed and the outside clutch re-engages. This differentiating action occurs automatically for right and left turns and in both forward and reverse directions.

While such locking differential products have been well received by off-highway and high-performance automotive enthusiasts, original equipment manufacturers ("OEMs") have been slow to accept such products for use in new vehicles. OEMs have expressed several concerns with existing locking differentials. For example, the functioning of most locking differentials produces a series of clicking, ratcheting or clanking sounds during vehicle cornering as the clutch driver alternately engages and disengages the coupler. While these sounds are usually not a problem for off-highway or high-performance racing, they may be objectionable for day-to-day driving.

Existing locking differentials can also create an understeering condition during vehicle turning as power is diverted from the outside wheel to the inside wheel. Again, while this behavior is generally not a problem for off-highway or high-performance driving, it may be objectionable for day-to-day driving where a more balanced power distribution would be preferred. OEMs are also concerned that frequent ratcheting of the driver and coupler may create increased wear and tear on the differential gear assembly leading to decreased durability.

Several existing locking differential manufacturers have attempted to address some of these concerns by adding compensating components, such as hold-out rings, additional pinion gears, and silencers. However, these modifications do not eliminate occasional clanking sounds, and add significant numbers of components representing substantial increase in both labor and material costs. Other manufacturers offer locking differentials which are selectable, such that they can be engaged or disengaged, as desired. However, these products have many external components and are not adapted to be fitted into a standard differential casing, making them prohibitively expensive either as aftermarket items or as OEM vehicle options.

For example, ARB of Victoria, Australia offers a selectable locking differential which replaces the entire differential gear assembly and differential casing of a vehicle. The ARB product utilizes a pneumatically-actuated piston to lock one of the side gears to the differential casing such that up to 100% of the torque is delivered to the other side gear through the pinion gears. Additional pinion gears and shafts are added to carry the increased torque. An air compressor is also required to be installed in the vehicle to produce the pressurized air needed to operate the ARB locking differential. For retrofit installations, a hole must be drilled through the differential carrier and axle housing in order to introduce a pneumatic control line. The installation procedure alone for installing the ARB locking assembly, pneumatic actuator and air compressor is prohibitively expensive for many automotive consumers and may, at least for retrofit applications, introduce abrasive metal particles into the differential gear assembly.

SUMMARY OF THE INVENTION

Accordingly, there is a need for a selectable locking differential that is quiet and relatively inexpensive to manufacture and which is easily and inexpensively retrofitted into a conventional automotive differential casing.

In accordance with one embodiment the present invention provides a locking differential kit adapted for assembly into a casing of an automotive differential gear assembly disposed between a first drive axle shaft and a second drive axle shaft for converting a conventional differential gear assembly into a locking differential gear assembly which can be selectably actuated to lock the first drive axle shaft to the second drive axle shaft.

In accordance with another embodiment the present invention provides a locking differential assembly for selectably locking a first drive axle shaft to a second drive axle shaft. The locking differential assembly comprises first and second differential side gears which are angularly fixed with respect to the first and second drive axle shafts. One or more differential pinion gears are also provided and are operably engaged between the first and second side gears for allowing rotational differentiation thereof. A locking mechanism is adapted to selectably lock the first and second differential side gears to one another so as to provide the function of a solid axle.

In accordance with yet another embodiment the present invention provides a locking mechanism for selectably locking a first differential side gear to a second differential side gear of an automotive differential gear assembly. The locking mechanism comprises a pair of interlocking clutch members adapted to be installed on either side of a differential pinion shaft. Each of the interlocking members has a face spline formed thereon adapted to selectably engage a corresponding mating face spline formed on each differential side gear. The interlocking members can be moved into selective engagement with the first and second differential side gears so as to prevent substantial rotational differentiation thereof, thereby providing the function of a solid axle.

In accordance with yet another embodiment the present invention provides a method for selectably locking an automotive differential gear assembly disposed between a first drive axle shaft and a second drive axle shaft. The method comprises actuating a pair of interlocking clutch members disposed between a first differential side gear and a second differential side gear so as to lock the side gears together, thereby preventing substantial rotational differentiation of the first and second drive axle shafts.

In accordance with yet another embodiment the present invention provides an actuator assembly for actuating a locking clutch mechanism disposed within a rotating casing of a vehicular differential. The actuator assembly comprises an actuator rod disposed within a central bore formed axially through a pinion shaft of the vehicular differential. The actuator rod has one or more cam surfaces disposed thereon adapted to engage one or more corresponding actuator balls. The actuator balls are disposed within corresponding openings formed transversely through the pinion shaft and are positioned such that when the actuator rod is displaced axially the cam surfaces force the actuator balls outward, thereby actuating the locking clutch mechanism.

In accordance with yet another embodiment the present invention provides a locking differential for selectably locking a first axle shaft to a second axle shaft. The locking differential comprises a differential case comprising a substantially open interior portion and an outer portion comprising a ring gear adapted to be driven by a drive gear connected to a power source. First and second differential side gears are disposed within the interior portion of the differential case and are angularly fixed with respect to the first and second axle shafts. A pair of differential pinion gears are rotatably mounted on a common pinion shaft and in engagement with the first and second differential side gears for allowing rotational differentiation thereof. Each of the differential side gears has an inner face and an outer face. The inner face has a face spline formed thereon. A pair of interlocking clutch members are also provided mounted on either side of the pinion shaft. Each of the interlocking clutch members has a corresponding face spline formed on an outer face thereof adapted to engage the face spline formed on the inner face of each differential side gear. An actuator is provided for selectably moving the interlocking clutch members into engagement with the first and second differential side gears so as to prevent substantial rotational differentiation thereof, thereby providing the function of a solid axle.

These and other objects and advantages of the present invention will become readily apparent to those skilled in the art having reference to the following figures and accompanying detailed description of the preferred embodiments. The following description is provided by way of illustration only and is not to be construed as limiting in any way on the scope of the invention disclosed herein.

BRIEF DESCRIPTION OF THE DRAWINGS

FIG. 10 is side elevational view of the inner surface of an interlocking clutch member having features in accordance with the present invention;

FIG. 11 is a side elevational view of the outer surface of the interlocking clutch member of FIG. 10;

FIG. 12 is a top plan view of the interlocking clutch member of FIG. 10;

FIG. 13 is a bottom plan view of the interlocking clutch member of FIG. 10;

FIG. 14 is a plan view of the interlocking dog clutch member of FIG. 13 rotated 90 degrees;

FIG. 17a is a cross-sectional view of a pinion shaft actuator assembly having features in accordance with the present invention, the actuator assembly being illustrated in the unactuated condition;

FIG. 17b is a cross-sectional view of the pinion shaft actuator assembly of FIG. 17a illustrated in the actuated condition;

FIG. 20 is an enlarged perspective view of a differential carrier and housing schematically illustrating a locking differential selector having features in accordance with the present invention.

DETAILED DESCRIPTION OF THE PREFERRED EMBODIMENTS

Figure 1:
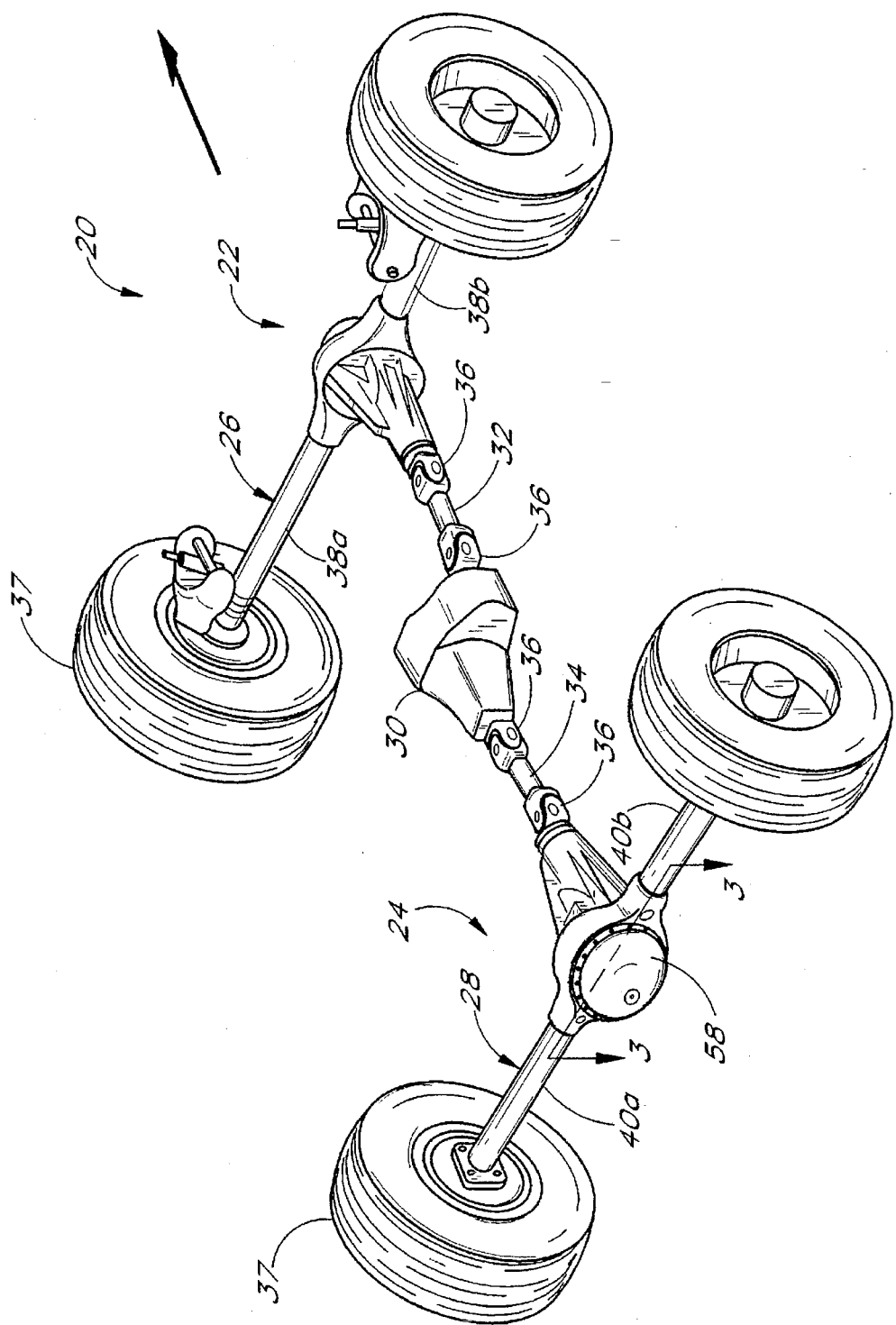
FIG. 1 is a perspective view of a four-wheel-drive automotive drive train assembly showing differential units on both the front and rear axles.

FIG. 1 illustrates a typical drive train assembly 20 for a four-wheel-drive vehicle. The drive train assembly 20 includes a central transmission 30 for providing input power from an engine (not shown) to the drive train. This power is distributed to front and rear differentials 22 and 24 via front and rear drive shafts 32 and 34 and a plurality of associated universal couplings 36. It will be appreciated by those skilled in the art that rotation of the drive shafts 32, 34 causes rotation of the front and rear axles 26, 28 via the front and rear differentials 22, 24.

Each of the axles 26, 28 comprises a pair of axle shafts or half-axles leading to outboard wheels 37. Thus, the front axle 26 comprises a right axle shaft 38a and a left axle shaft 38b. Likewise, the rear axle 28 comprises a right axle shaft 40a and a left axle shaft 40b. The front and rear differentials 22, 24 allow for differentiation, or unequal rotation, of the axle shafts. As is well known, when a four-wheeled vehicle is negotiating a turn, the inner and outer wheels must rotate at different speeds in order to prevent scuffing of the tires. This is desirable for most normal driving conditions and provides well-behaved vehicle performance.

Figure 2:
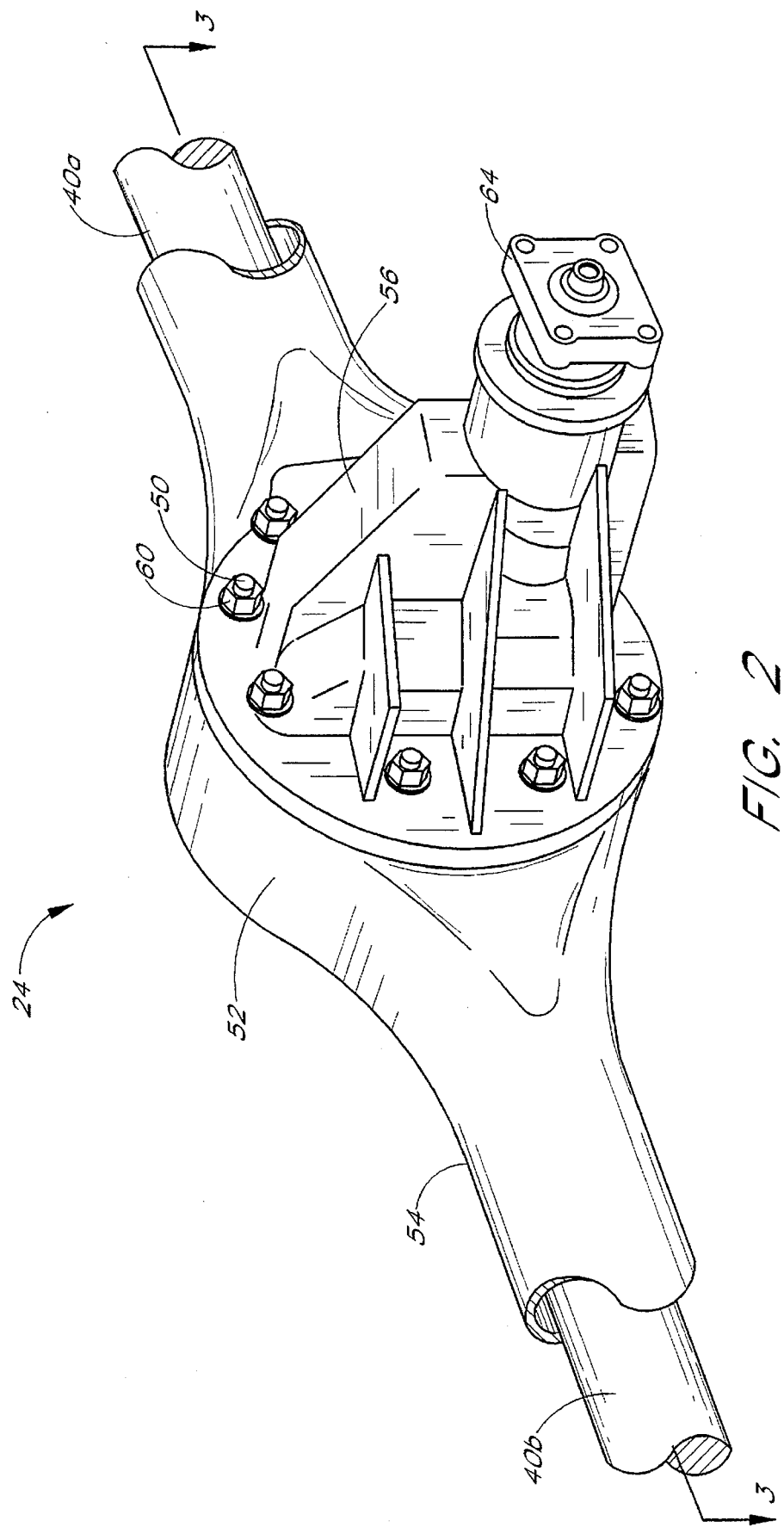
FIG. 2 is an enlarged perspective view of a conventional automotive differential, illustrating the carrier and housing.

FIG. 2 illustrates the outer assembly or housing of a conventional automotive differential. An exterior housing 52 defines a pair of lateral side tubes 54 within which are disposed the right and left axle shafts 40a,b. The housing 52 typically has a generally ring-shaped middle portion, as shown, open on both front and rear sides, with circular flanges (not shown) extending radially inward on the front and rear sides. A housing cover 58 (FIG. 1) mounts on the rear side of the differential housing 52 to seal the housing from dirt and debris. A carrier 56 is mounted to the other side of the housing 52, as shown.

The carrier 56 carries a drive gear (not shown) which transmits power from a drive coupling 64 to the differential gear assembly and then to the axle shafts 40a,b. Typically, threaded holes are provided in the housing 52 for receiving studs 50. These studs extend outward to provide threaded mounts for attaching the carrier 56 on one side and the housing cover 58 (FIG. 1) on the other. A plurality of nuts 60 secure both elements to the housing 52 with gaskets typically provided therebetween. Alternatively, one or the other of the carrier 56 or cover 58 may be welded to the housing 52, as is well known to those skilled in the art. The enclosure thus formed ensures a sealed lubricated environment within which the differential gear assembly is housed.

Figure 3:
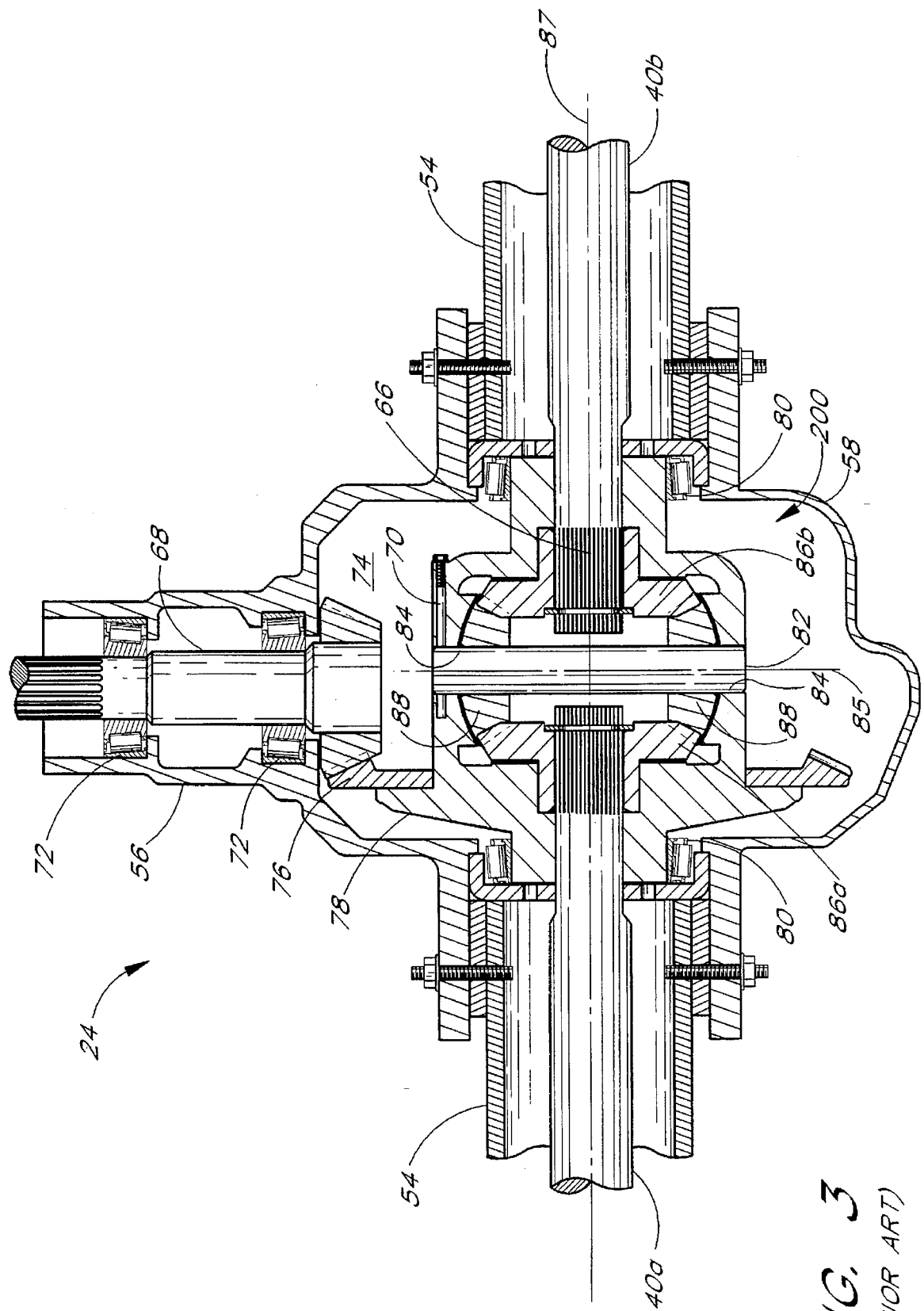
FIG. 3 is a top plan cross-sectional view of the differential of FIG. 2, illustrating a conventional open differential gear assembly.

FIG. 3 is a horizontal cross section of the differential 24 of FIG. 2, illustrating the differential gear assembly disposed therein. As noted above, the generally funnel-shaped carrier 56 forms part of the lubricated enclosure for the differential gear assembly and carries the drive gear 68 journaled with respect to the carrier 56 by a pair of bearings 72. The drive gear 68 receives power from the engine through an associated coupling and gear box (not shown). The teeth of the drive gear (typically hypoid or spiral) engage a corresponding bevelled differential ring gear 76, as shown. The ring gear 76 drives a differential case 78 rotatably supported within the space 74 by a pair of differential bearings 80. The bearings 80 laterally surround outwardly extending bearing surfaces formed on the ends of the differential case 78, as shown.

A pair of beveled differential side gears 86a,b are rotatable supported within the differential case 78, as shown. Each side gear 86a,b is connected to the inboard end of its corresponding axle shaft 40a,b via a spline connection as is well known in the art. A pair of opposed beveled differential pinion gears 88 are disposed between the side gears 86a,b, as shown, such that the pinion gears 88 mesh with the bevelled differential side gears 86a,b. The pinion gears 88 are typically mounted on a common pinion shaft 82, as shown, the pinion gears having through-bores formed therein, providing suitable bearing surfaces. The pinion shaft 82 is secured in place within a pair of aligned apertures 84 formed in the differential case 78 by a retaining pin 70. The center of the pinion shaft 82 defines an axis 85 lying in a plane orthogonal to a common axis 87 of the axle shafts 40a,b and side gears 86a,b. Thus, the side gears 86a,b and pinion gears 88 always rotate about perpendicular axes.

In operation, power is delivered to the differential case 78 via the drive gear 68. Rotation of the differential case 78 causes the pinion shaft 82 and differential pinion gears 88 disposed on the ends thereof to revolve about the common axis 87 of the axle shaft. Mating engagement between the teeth of the differential pinion gears 88 and opposing side gears 86a,b transmits driving torque to each corresponding axle shaft 40a,b, causing them to turn and propel the vehicle in a desired direction. During vehicle cornering the operational coupling of the side gears 86a,b through the differential pinion gears 88 allows relative rotation or "differentiation" between the side gears 86a,b such that power continues to be distributed to each of the two axle shafts 40a,b while allowing for variances in the rotational speed of each axle relative to the other.

Up to this point elements common to many conventional automotive differentials have been described. The present invention provides an improved differential gear assembly which can be retrofitted into a conventional automotive differential casing and which can be selectably activated to provide a fully locked or "solid" axle or deactivated to provide a conventional open differential. In one preferred embodiment, a locking differential kit is provided which is adapted to be retrofitted into an existing automotive differential casing. Alternatively, a locking differential constructed in accordance with the present invention may be installed in a new vehicle as a standard feature or factory option, as desired.

Locking Differential Gear Assembly

Figure 4:
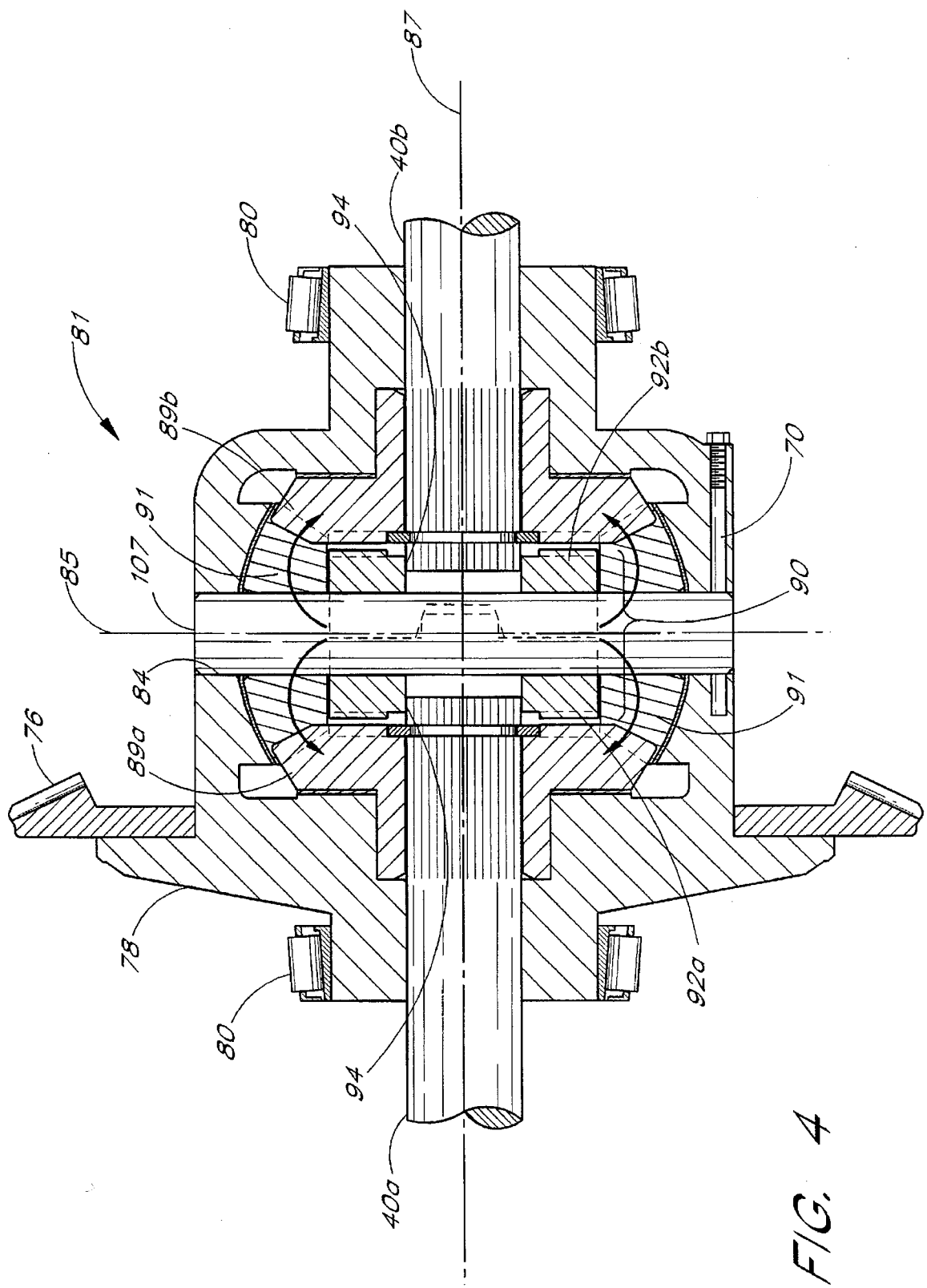
FIG. 4 is an enlarged cross-sectional view of a locking differential gear assembly having features in accordance with the present invention, the differential gear assembly being illustrated in the unlocked condition.
Figure 5:
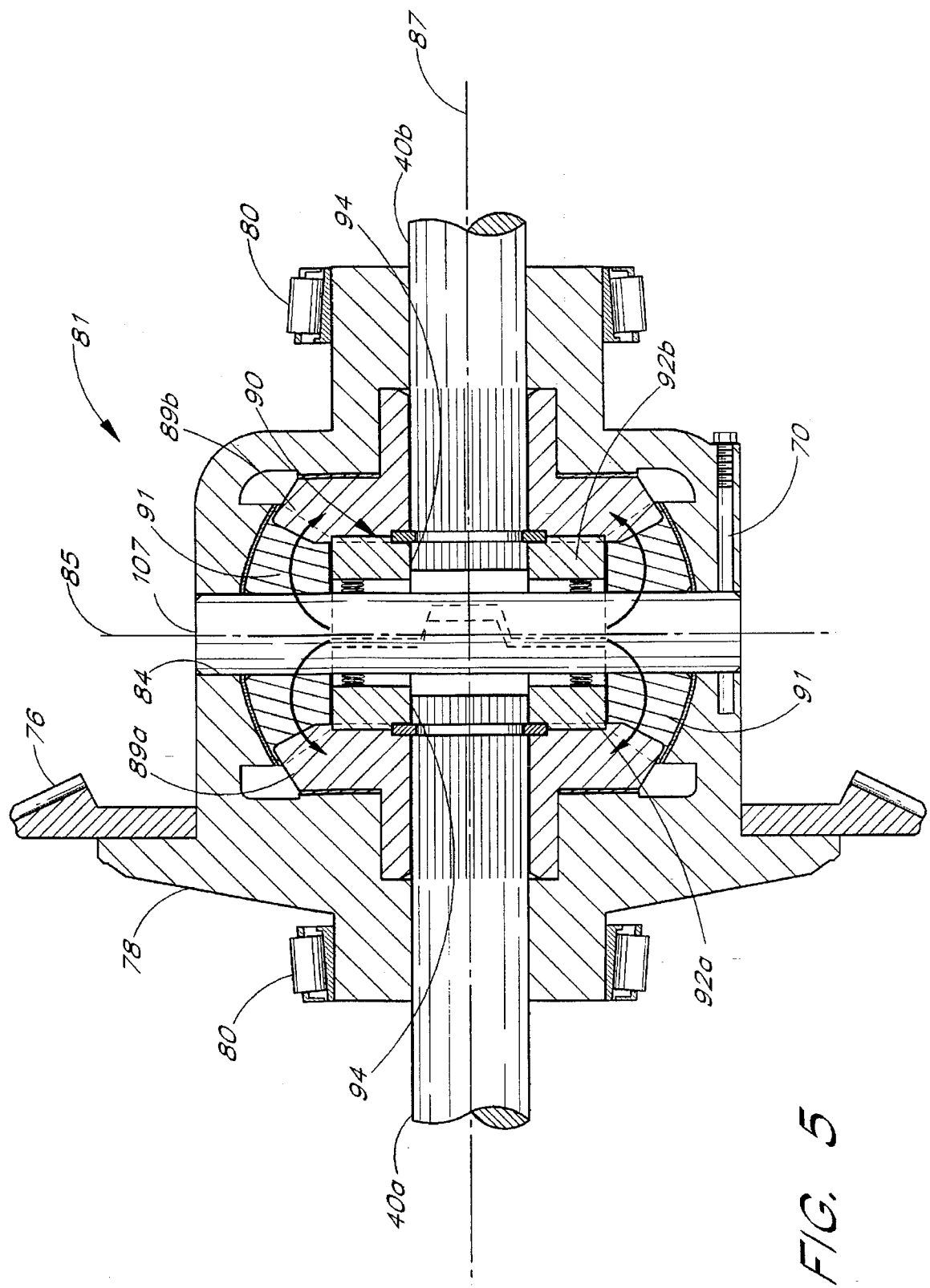
FIG. 5 is an enlarged cross-sectional view of the locking differential gear assembly of FIG. 4 illustrated in the locked condition.

FIGS. 4 and 5 are cross-section views of a selectable locking differential gear assembly 81 having features in accordance with the present invention. The locking differential gear assembly 81 is characterized by a pair of locking side gears 89a,b each having a dog-tooth face spline formed on the inner face thereof. A novel interlocking dog clutch assembly 90 is disposed within the space defined by the locking side gears 89a,b and differential pinion gears 91. The dog clutch assembly 90 is adapted to lock the side gears 89a,b together when the locking differential 81 is activated, simultaneously locking the axle shafts 40a,b together.

Briefly, the dog clutch assembly 90 comprises a pair of interlocking clutch members 92a and 92b adapted to mate with one another and to each corresponding locking side gear 89a,b. Each interlocking clutch member 92a,b has a dog-tooth face spline formed on the outer surface thereof adapted for locked engagement with the corresponding face spline formed on the inner face of each corresponding locking side gear 89a,b. A large central through-bore 94 is also formed in each interlocking clutch member 92a,b for accommodating the inboard end of each corresponding axle shaft 40a,b. The diameter of the bore 94 is preferably at least slightly larger than the outer diameter of each axle shaft 40a,b so as to permit relative rotation between each of the interlocking clutch members 92a,b and the axle shafts 40a,b. Alternatively, the bore 94 may be formed only partially through each clutch member 92a,b as needed to provide adequate clearance between each clutch member 92a,b and each corresponding axle shaft 40a,b.

When the differential assembly 81 is in its unlocked position, as shown in FIG. 4, the interlocking clutch members 92a,b are biased together around the pinion shaft 107 so that they clear the locking side gears 89a,b, as shown. In this position the locking clutch members 92a,b are spaced apart from the adjacent inner faces of the locking side gears 86a,b, as shown. In this mode, the differential assembly 81 behaves essentially like a conventional open differential, with full differentiation being provided by the pinion gears 91. No clicking, ratcheting, or clanking sounds are generated by the dog clutch assembly 90 since, when adequate clearance is provided to avoid contacting the locking side gears 89a,b, the interlocking members 92a,b simply rotate with the pinion shaft 107.

When the differential assembly 81 is in its locked position, as shown in FIG. 5, the interlocking clutch members 92a,b are biased outward so as to engage locking side gears 89a,b. The clutch members 92a,b remain engaged with one another so that the locking side gears 89a,b become locked to one another through the clutch members 92a,b. In this mode the differential assembly 81 behaves essentially like a solid axle.

Interlocking Dog Clutch Assembly

Figure 6:
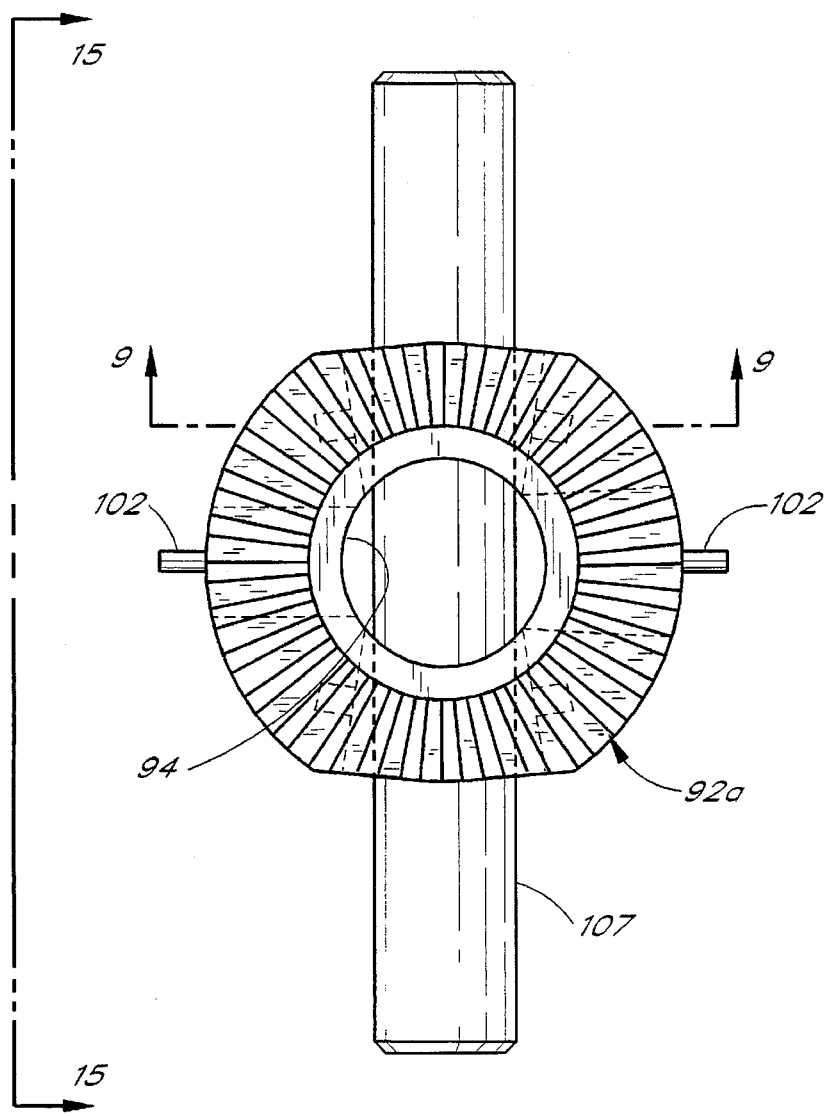
FIG. 6 is a side elevational view of a locking dog clutch assembly having features in accordance with the present invention.
Figure 7:
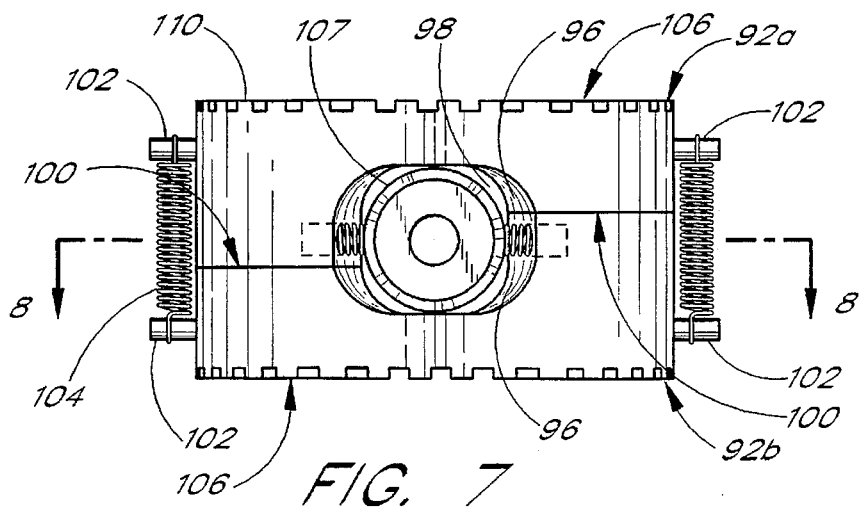
FIG. 7 is a plan view of the locking dog clutch assembly of FIG. 6.

FIGS. 6–9 illustrate in more detail the preferred construction of an interlocking dog clutch assembly in accordance with the present invention. FIG. 6 is a side elevational view of the interlocking dog clutch assembly of FIG. 4 looking inward from one of the locking side gears 89a. FIG. 7 is a plan view of the interlocking dog clutch assembly of FIG. 4 looking inward from one of the pinion gears 91.

As shown in FIG. 7, the interlocking clutch members 92a,b comprise mating halves which surround the pinion shaft 107. The interlocking clutch members 92a,b may be machined from any relatively strong grade of alloy steel. In a particularly preferred embodiment, a 9310 case-hardened steel alloy, coated with a suitable rust inhibitor, is used. Each interlocking clutch member 92a,b includes an outer face 106 and an inner face 100, as shown in FIG. 7. The outer face has a spline formed thereon (FIG. 6) adapted for locked engagement with the face spline formed on the inner face of each corresponding locking side gear 89a,b (FIG. 4). The inner face 100 of each interlocking member 92a,b defines channel portions 96 which, together with the opposed channel portions on the other interlocking member, define a space or recess 98 for accommodating the locking differential pinion shaft 107.

The channel portions 96 of the interlocking clutch members 92a,b preferably diverge in a generally radially outward direction, as shown in FIG. 7. The distance across each channel portion 96 is smallest at the intersection with the central throughbore 94, and largest at the outer periphery of the interlocking member 92a,b. Adequate clearance is provided between the pinion shaft 107 and the channel portions 96 even at the narrowest point, although the gap widens farther outward. This generally hourglass-shaped pinion shaft recess 98 allows for limited relative rotation of the interlocking clutch members 92a,b relative to the pinion shaft 107, as will be explained later.

Figure 8:
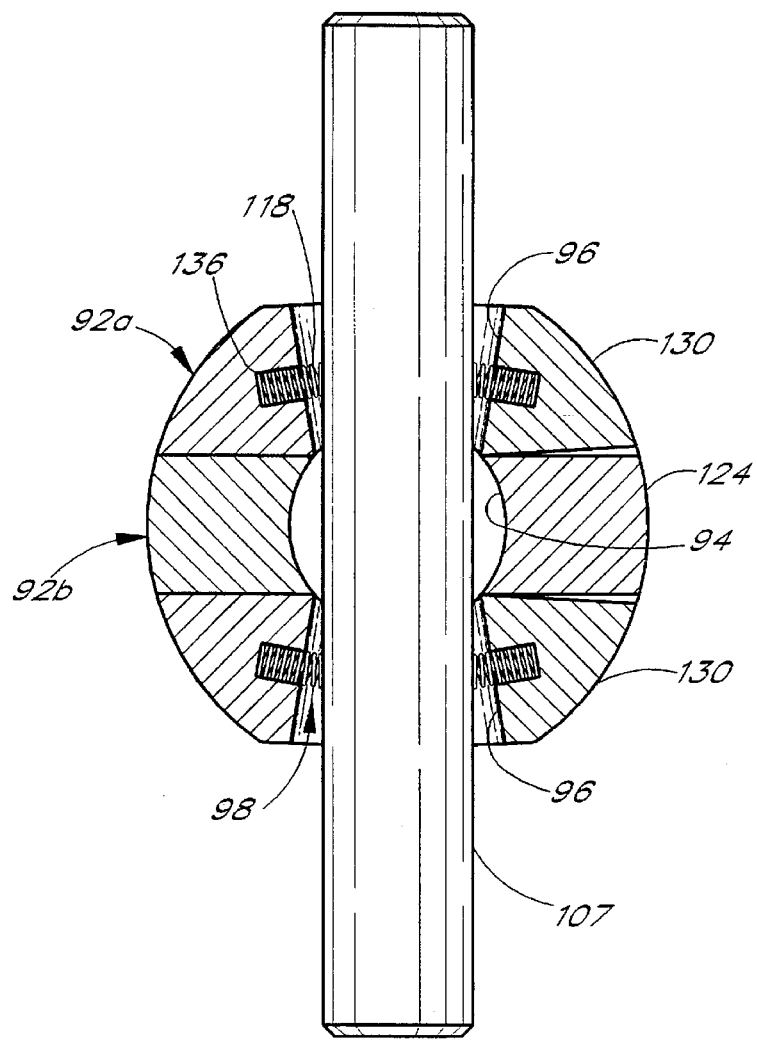
FIG. 8 is a partial cross-sectional view of the locking dog clutch assembly of FIG. 7.
Figure 9:
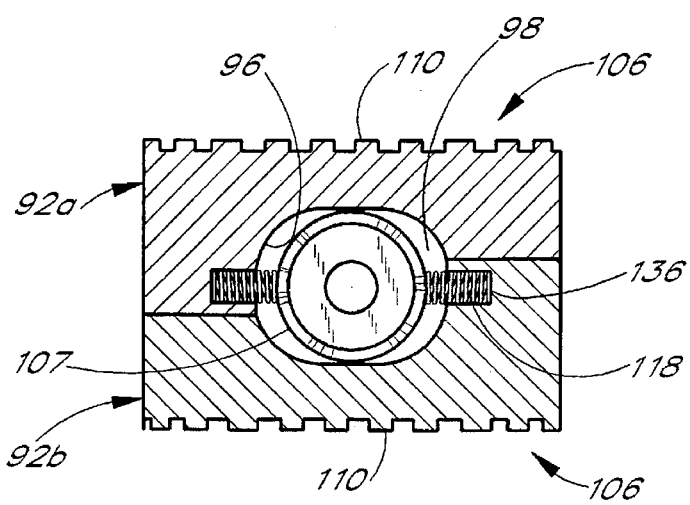
FIG. 9 is a partial cross-sectional view of the locking dog clutch assembly of FIG. 6.

Four centering springs 118 are provided, as shown in FIG. 8, for biasing the pinion shaft 107 into a central position between the respective channel portions 96 in the pinion shaft recess 98. Each centering spring 118 is constrained to act along a defined axis by virtue of being held within apertures 136. The springs 118 contact the pinion shaft 107 (which is fixed with respect to the case 78) in order to center the interlocking clutch members 92a,b relative to the pinion shaft 107. This ensures that the interlocking members 92a,b are able to rotate at least a slight amount in either direction from their unactuated positions. Centering springs 118 having an outer diameter of about 0.265 inches, an uncompressed length of between about 0.50 and 0.625 inches, and a spring constant of about 400 lbs/in should be suitable for most purposes. Other spring sizes or shapes may be used while still enjoying the benefits of the present invention.

Each interlocking clutch member 92a,b also includes two or more angularly spaced spring retainer pins 102, as shown in FIG. 6. Corresponding retainer springs 104 extend between pins 102 provided on opposing interlocking clutch members 92a,b, as shown in FIG. 7. In an unlocked mode, the retainer springs 104 maintain the interlocking clutch members 92a,b in mating contact around the pinion shaft 107, as shown in FIG. 6 and out of engagement with the side gears 89a,b. If desired, the pinion shaft 107 may be fitted within an optional rectangular alignment block (not shown) disposed within the recess 98 in order to better maintain alignment of the interlocking clutch members 92a,b during operation.

Interlocking Clutch Members

FIGS. 10–14 illustrate an interlocking clutch member 92a having features of the present invention. Preferably each clutch member 92a,b is interchangeable with the other such that only one need be described herein. Of course, non-interchangeable clutch members can also be used, as desired, while still enjoying the advantages and benefits of the present invention. It can be seen from FIG. 10 that the channel portions 96 divide the interlocking clutch member 92a into two generally semi-circular mating regions—a male region 120 and a female region 122. The male region 120 comprises a central male engagement member 124 projecting above flat relief regions 126 on either side. The male engagement member 124 is preferably formed as a truncated cylinder partially projecting above the relief regions 126 and having a flat top surface 125, as shown. The female region 122 comprises a central female engagement recess 128 disposed between two upstanding lugs 130 having flat tops 131. When the two members 92a,b are mated, the lugs 130 of one member contact the relief regions 126 on the other member, and visa versa.

Figure 15A:
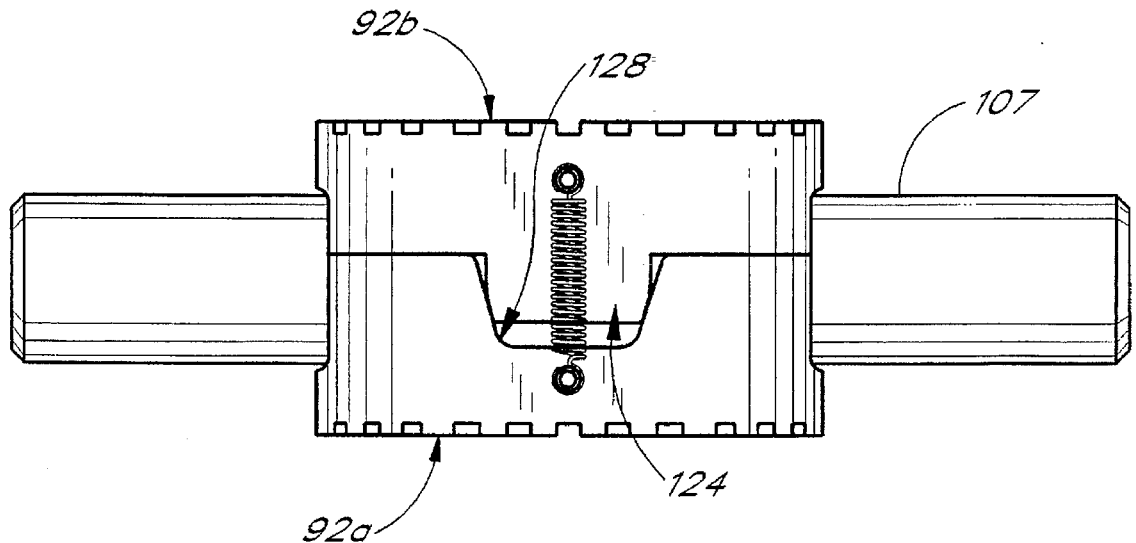
FIG. 15a is a top plan view of the dog clutch assembly of FIG. 7, illustrated in the unlocked condition.
Figure 15B:
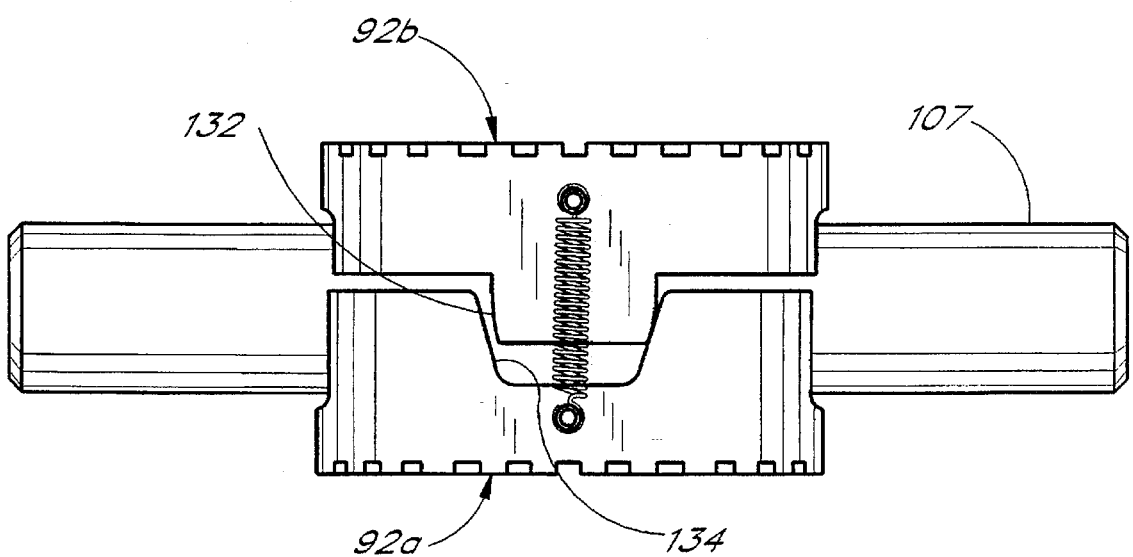
FIG. 15b is a top plan view of the dog clutch assembly of FIG. 7, illustrating the camming action of the interlocking clutch members.

As shown in FIGS. 15a and 15b, the male engagement member 124 is sized to fit within the female engagement recess 128 when the two interlocking members 92a,b are mated together. The female engagement member 124 has curved (preferably helical) side walls 134 adapted to slidingly engage the curved outer surfaces of the male engagement member 124 as the clutch members are rotated relative to one another, as illustrated in FIGS. 15a and 15b. This sliding contact between the curved walls 132 of the male engagement member 124 and the helical-shaped side walls 134 of the female engagement recess 128 results in a camming action when a torque is applied across the locked clutch assembly. This camming action forces the clutch members 92a,b outward when the differential assembly 81 is in the locked condition, increasing the engagement force of each clutch member with its corresponding locking side gear 89a,b so as to prevent disengagement of the clutch members as driving torque is applied.

As noted above, each interlocking clutch member 92a,b comprises on the outer face 106 a dog-tooth face spline 110, as shown in FIG. 11. The face spline 110 preferably comprises teeth 108 formed in a radial pattern disposed about a central axis of the throughbore 94. Alternatively, any other face spline configuration of straight, curved or angled teeth may be used while still enjoying the benefits and advantages of the present invention. As shown in FIG. 11a, each tooth 108 preferably has tapered sides 112 extending from essentially flat bottom grooves 114 disposed between each tooth. The bottom grooves 114 preferably are formed in a plane orthogonal to the throughbore axis of the interlocking member 92a,b. The tapered sides 112 of each tooth 108 make a shallow angle $\theta$ with respect to the normal axis, as indicated by the line 116. This angle $\theta$ is referred to as the pressure angle and is preferably between about 0°–10°. More preferably, the pressure angle $\theta$ is between about 5°–7°.

As noted above, the face spline 110 formed on the outer face of each clutch member 92a,b is adapted to matingly engage a similar face spline formed on the inner face of each locking side gear 89,b, as will be further explained below.

Locking Side Gears

Figure 16:
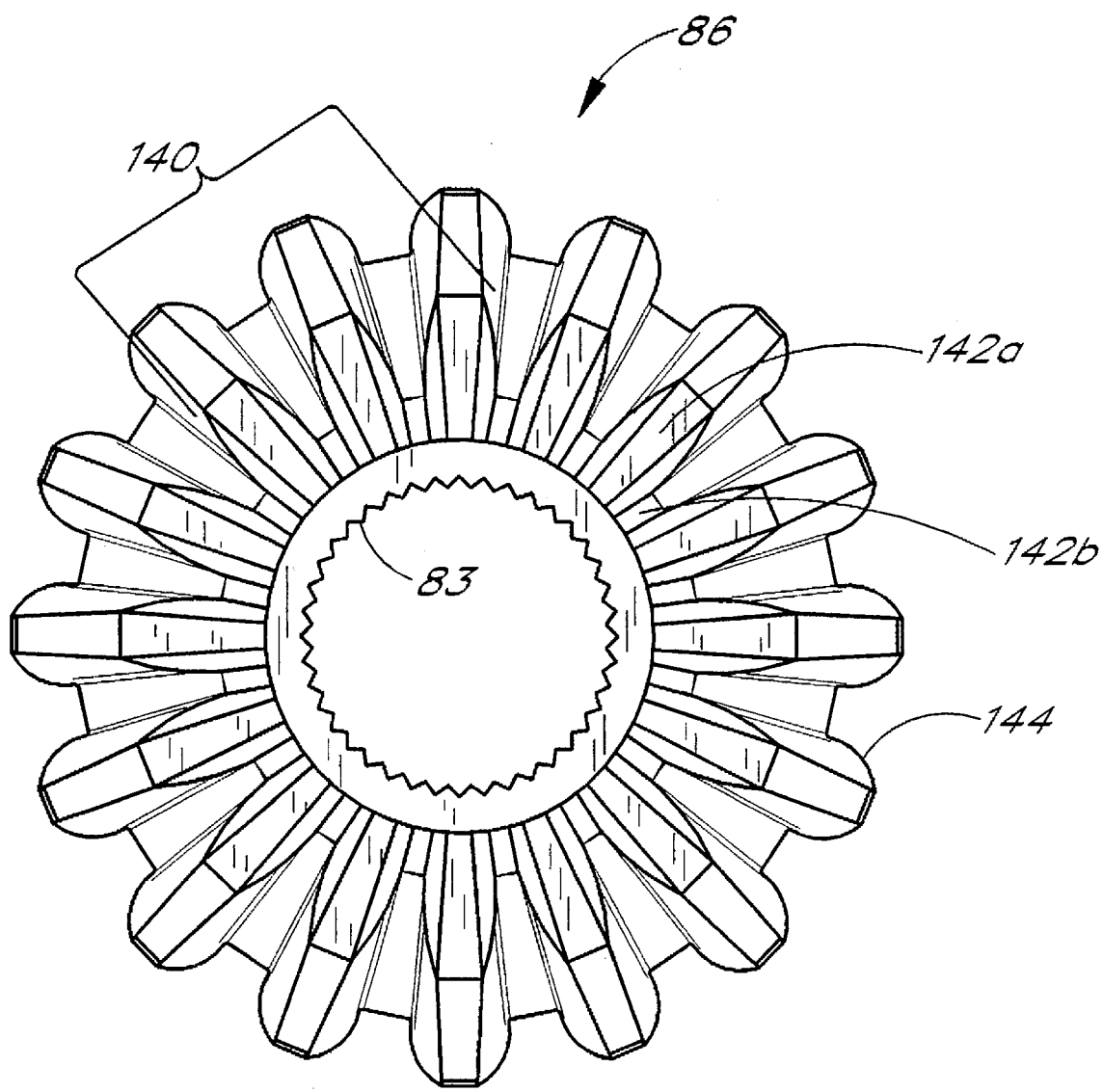
FIG. 16 is side elevational view of the inner face of a locking differential side gear having features in accordance with the present invention.

FIG. 16 is a side elevational view of a locking side gear 89a of FIG. 4 looking outward from the locking dog clutch assembly 90. Preferably the locking side gears 89a,b are interchangeable such that only one need be described herein. Again, non-interchangeable locking side gears can also be used, as desired, while still enjoying the benefits and advantages of the present invention. The side gears 89a,b are preferably similar to a conventional beveled differential side gear in that they have a plurality beveled teeth 144 and a spline 83 adapted to engage a corresponding spline 66 provided on the inboard end of each axle shaft 40a,b (FIG. 3).

In addition, the locking differential side gear 86 in accordance with the present invention has a face spline 140 formed on the inner face thereof. The face spline 140 includes a plurality of radially directed teeth 142a, 142b adapted to mate with the face spline 110 formed on the other face of each corresponding interlocking clutch member 92a,b, as described above in connection with FIG. 7. The longer spline teeth 142a correspond to each side gear bevel tooth 144, while shorter spline teeth 142b are provided between the longer teeth, as shown. In the illustrated embodiment, therefore, the number of teeth 142a,b is roughly double (2n−1) the number (n) of bevel gear teeth 144. Although this arrangement is preferred, those skilled in the art will readily appreciate that a wide variety of other arrangements are also possible. Thus, the particular configuration shown should be taken as an illustrative example only.

Preferably, each spline tooth 142a,b has a tapered cross-section with a pressure angle preferably equal to the corresponding pressure angle defined by the teeth 108 formed on the mating interlocking clutch member 92a,b—preferably between about 0°–10° and, more preferably, between about 5°–7°.

Actuation of the Dog Clutch Assembly

As noted above, the dog clutch assembly 90 is actuated by forcing apart the two interlocking members 92a,b against the retainer springs 104, as shown in FIG. 5. There are many different ways to accomplish this. The present invention contemplates a two-stage actuation process which ensures positive engagement of the interlocking members 92b with the side gears 89a,b. In this process, the interlocking members 92a,b are first urged apart a short distance into contact with the face spline 140 of the locking side gears. Depending on the rotational registry between the mating face splines 110 and 140, the mating clutch member and locking side gear may immediately engage, or engagement may be delayed. In this operation, the preferred pressure angles formed by the teeth 108 (FIG. 11a) and 142a,b (FIG. 16), facilitate engagement by creating a suitable gap between adjacent teeth of each mating spline at least slightly wider than the top surface of the teeth. Because the spline teeth are required to withstand substantial stress, however, the pressure angle is preferably not too great as the teeth may taper down too narrow and may become over-stressed.

When the face spline 110 of one of the interlocking clutch members 92a,b meshes with the face spline 140 of its associated side gear 89a,b, the interlocking member will be constrained to rotate with the locking side gear. As the two side gears 89a,b differentiate the first interlocking member 92a,b to mesh will rotate a small amount with respect to the case 78, and thus with respect to the opposite interlocking clutch member, as seen in FIG. 15b. This relative rotation between the two interlocking members 92a,b forces the unmeshed interlocking clutch member outward into engagement with its associated locking side gear 89a,b. More specifically, as briefly noted above, the side walls 134 defined by the female engagement recess 128 define a helical surface which urges the male engagement member 124 in contact therewith outward as the two members rotate relative to one another. The helix shape is formed on both side walls 134 so as to urge the male engagement member 124 outward regardless of the relative rotation between the two interlocking members 92a,b. This is the second, or positive locking, step of the actuation process. Ultimately, the two interlocking members 92a,b are forced outward to lock the side gears 89a,b and the associated axle shafts 40a,b.

The preferred distance each interlocking clutch member 92a,b must move to fully engage with its associated locking side gear 89a,b is approximately 0.080 inches. The helical surface 134 is designed so that about a 5.25° relative rotation of the interlocking members will force them apart this distance. The pinion recess 98, described above in connection with FIGS. 7 and 8, is preferably large enough to accommodate this degree of rotation in either direction. After engagement is complete, the centering springs 118 will again return the interlocking clutch members 92a,b to a centered position relative to the pinion shaft 107.

Advantageously, because the locking side gears 89a,b are locked directly to one another through the locking dog-clutch 90, the torque from the drive gear 68 is communicated from the pinion gears directly to the locking side gears 89a,b in parallel. Thus, the shear force exerted on each pinion gear 91 is evenly split between each locking side gear, as illustrated by the arrows in FIG. 5, such that the pinion gears will not be over-stressed even when the differential is in its locked condition. Of course, additional pinion gears can be added in order to provide an even more robust differential, as desired.

Pinion Shaft Actuator Assembly

Those skilled in the art will appreciate that a wide variety of actuator mechanisms may be used to selectively activate or deactivate the locking differential described herein. The actuator mechanism may comprise any variety of pneumatic, hydraulic, electromagnetic or mechanical transducers which respond to an actuating signal to produce a desired displacement of the interlocking clutch members 92a,b, the invention not being limited to any particular device.

FIGS. 17a and 17b illustrate, by way of example only, one possible embodiment of a pinion shaft actuator assembly 148 comprising a portion of a locking differential actuator having features of the present invention. The assembly 148 generally comprises a hollow pinion shaft 107, an actuating rod 150, an actuating cable 152 attached to one end of the rod, and a plurality of spring-loaded actuating balls 154 adapted to act against compression springs 156. The actuating rod 150 is adapted to slide freely within an elongated bore 158 formed through the pinion shaft 107. The rod 150 preferably includes two pairs of opposed conical cam depressions 160 arranged as shown, each depression having an included angle of between about 75° and 120°, and more preferably, about 100°. The two cam depressions 160 in each pair are opposed across the longitudinal axis 85 of the actuating rod 150, terminating at approximately the rod center, as shown.

Actuating balls 154 and actuating springs 156 are disposed adjacent each cam depression and in mechanical communication therewith. The springs 156 act between the balls 154 and the interlocking clutch members 92a,b, as shown. As seen in FIG. 17a, the actuating balls 154 reside largely within the depressions 160 when the actuating rod 150 is in its non-actuated position. This position corresponds to an unlocked state of the dog clutch assembly 90 (FIG. 4), with the two interlocking members 92a,b being held together in close proximity about the pinion shaft 107.

FIG. 17b shows the actuating rod 150 in its fully actuated position axially shifted from the position of FIG. 17a. Those skilled in the art will appreciate that as the rod 150 is moved axially, the cam depressions 160 move out of registry with the through holes 162 thus forcing the balls 154 outward in a camming action. As the balls 154 move outward, the actuating springs 156 compress and impart an outward force to the interlocking clutch members 92a,b. Eventually, the outward force of the four actuating springs 156 acting in combination overcomes the inward force of the retaining springs (not shown) holding the interlocking members 92a,b together. The interlocking members 92a,b are thus forced apart and into engagement with the side gears 89a,b, as described above in connection with FIG. 5.

The rod 150 may be displaced via an actuating cable 152. The cable 152 should be sufficiently strong to withstand tensile forces of between approximately 10–50 lbs., and more preferably about 20 lbs. A 0.050 inch diameter aircraft cable, for example, should be suitable for most purposes. A flexible elongated member, such as a tape, may also be used, if desired. Advantageously, a tape actuator can be made thinner to reduce the clearance area required at the end of the pinion shaft 107. A tape having a thickness of about 0.008 inches should be suitable for most purposes. The actuating cable 152 can be attached to the actuator rod 150 using any one of a number attachment techniques well known in the art, such as crimping, soldering or looped connection.

To accommodate the actuating cable or tape 152 one end of the pinion shaft 107 includes a cutout portion 202 leading to the inner bore 158 in which a pin 204 is positioned with a pulley 206 journaled thereon. The actuating cable 152 extends longitudinally through the bore 158 and is directed 90° around the pulley 206, as shown. Of course, a rounded corner formed at the end of the bore 158 could also serve to redirect the cable 152 and obviate the need for a pulley. Alternatively, the actuating rod 150 could be displaced using a hydraulic or pneumatic force, or it could be rotatably actuated, as desired. An optional shoulder 151 may be formed within the elongated bore 158, as desired, in order to prevent hyperextension of the actuating rod 150.

Electromagnetic Actuator

Figure 18A:
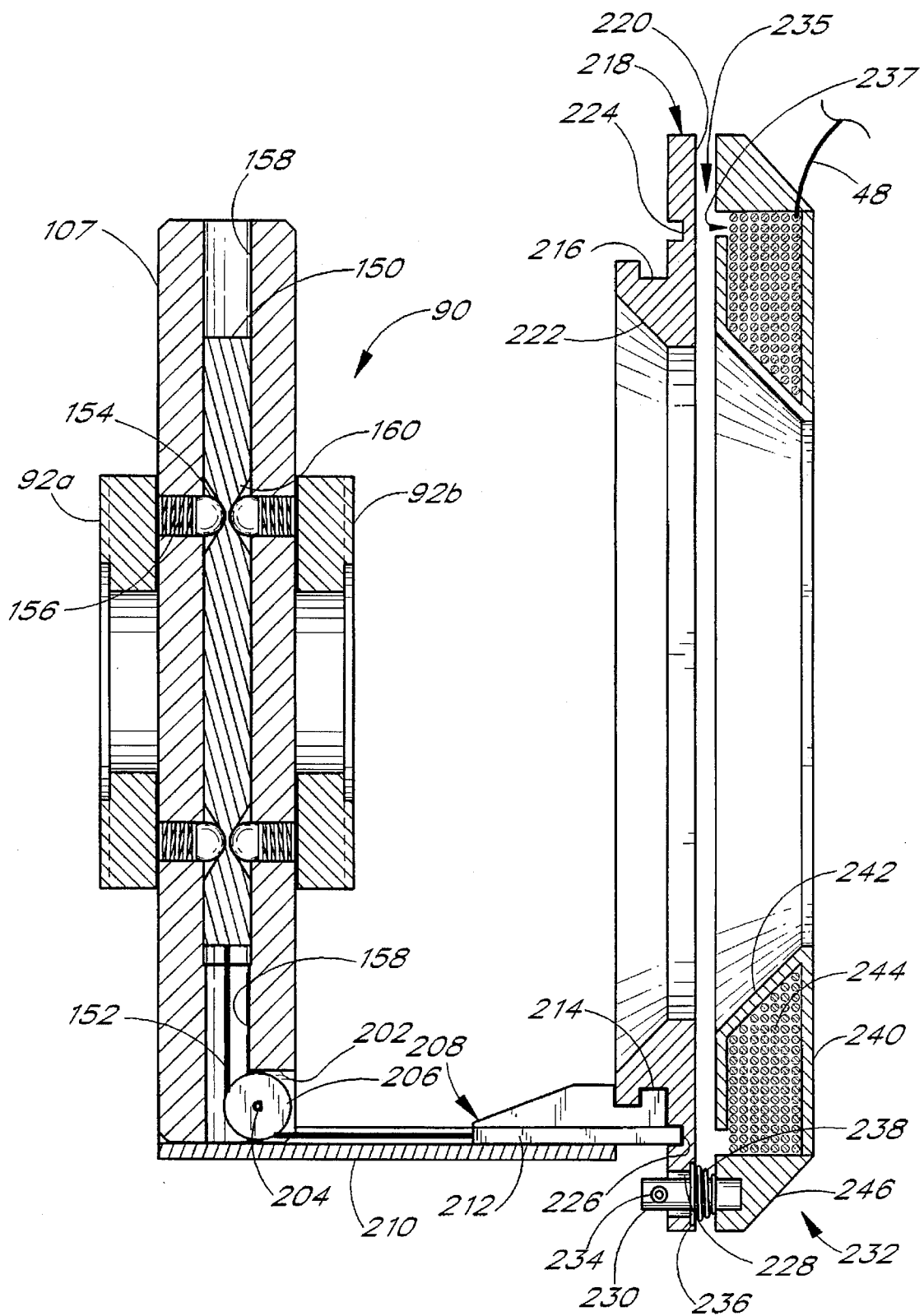
FIG. 18a is a cross-sectional view of an electromagnetic actuator assembly having features of the present invention, the actuator assembly being illustrated in the unactuated condition.
Figure 18B:
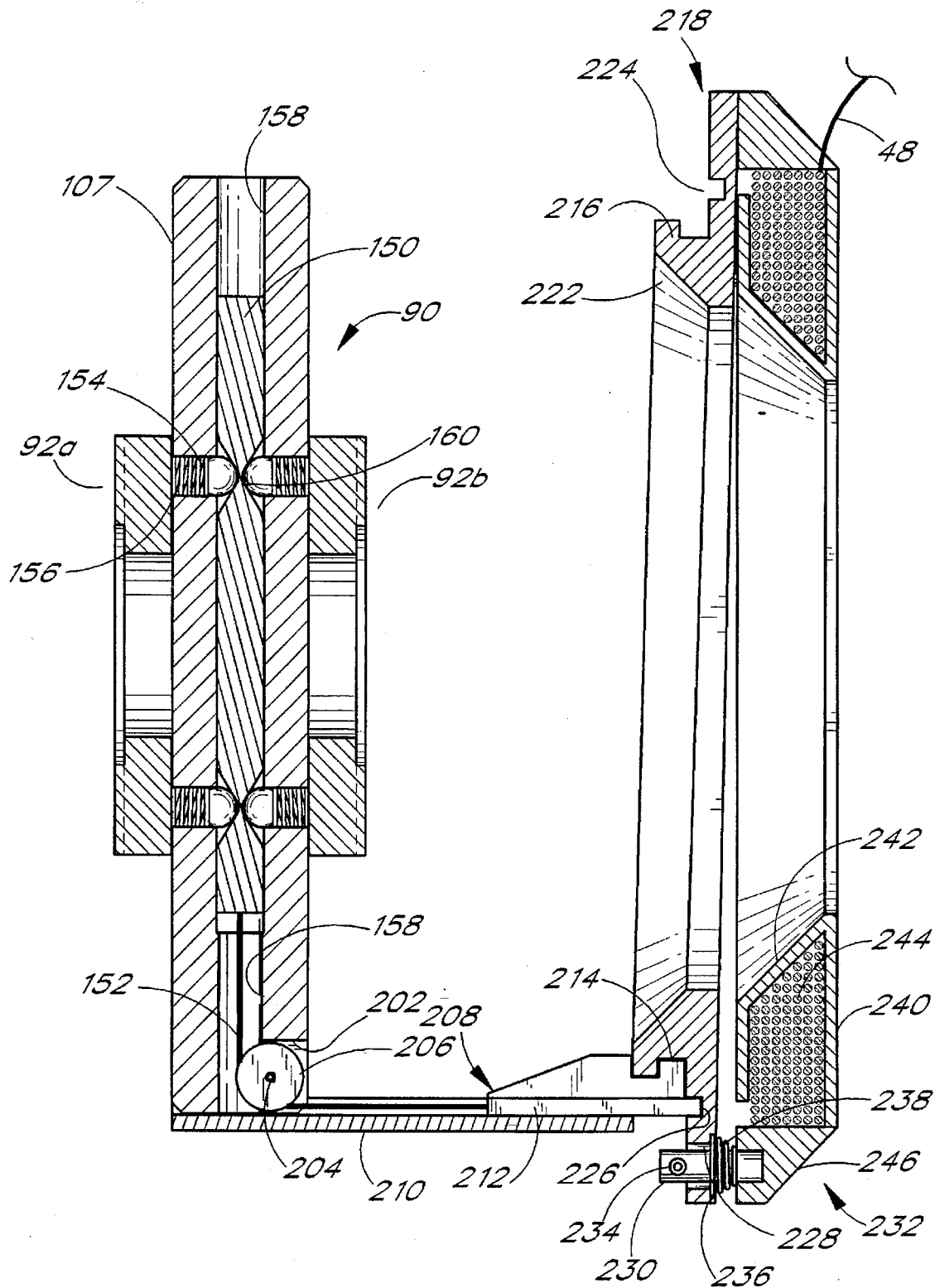
FIG. 18b is a cross-sectional view of the electromagnetic actuator assembly of FIG. 18a, illustrated in a partially actuated condition.
Figure 18C:
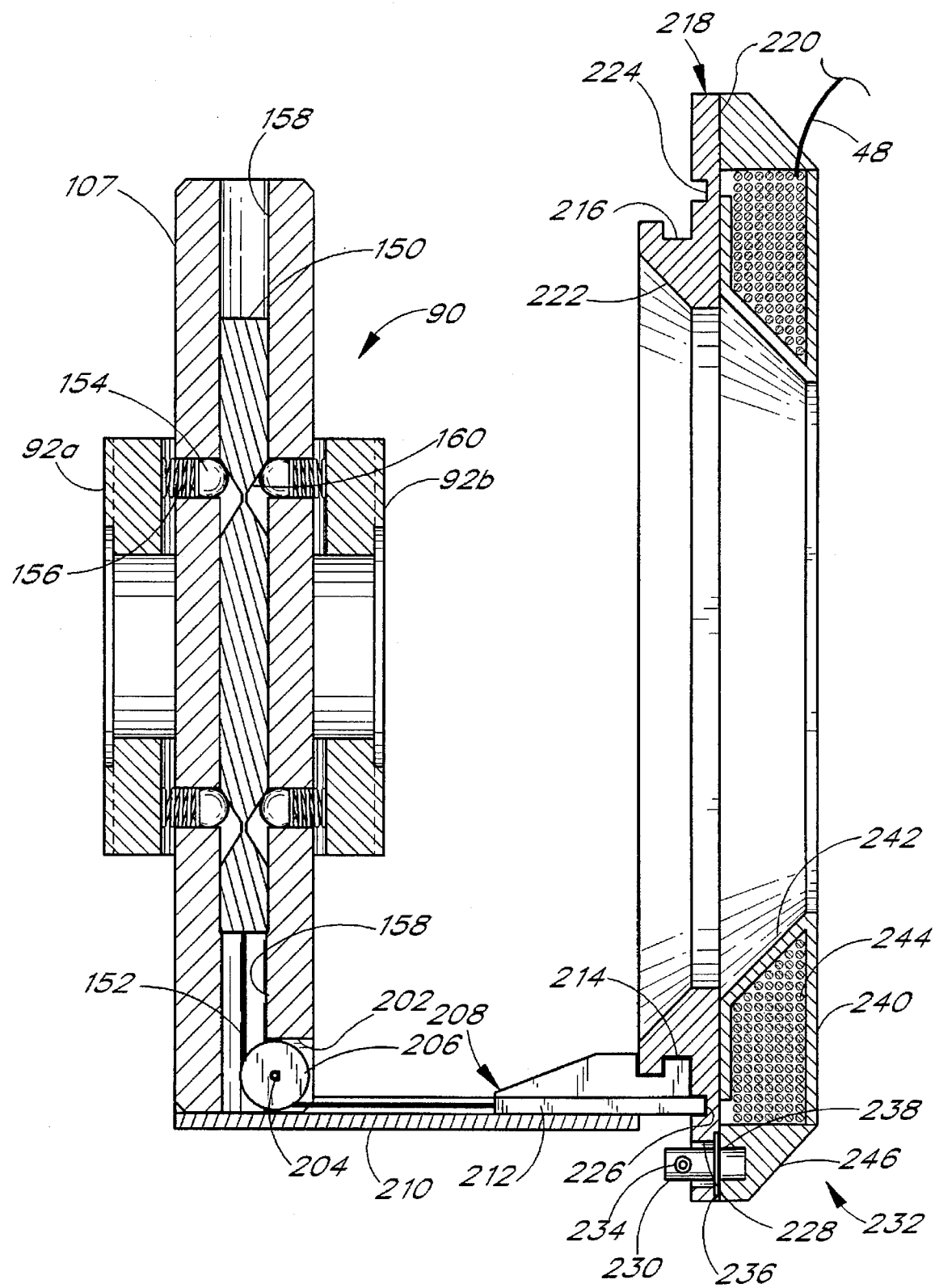
FIG. 18c is a cross-sectional view of the electromagnetic actuator assembly of FIGS. 18a and 18b illustrated in the fully actuated condition.

FIGS. 18a–c illustrate one possible embodiment of an electromagnetic actuator 200 for activating the dog clutch assembly 90 of the present invention. For purposes of illustration, the various actuator elements are shown outside of the differential carrier 56 and casing 78. Of course, the actuator would normally be assembled within the differential carrier or housing, although that is not necessarily required. Also, it should be noted that the present electromagnetic actuator 200 is described in conjunction with the pinion shaft actuator assembly 148 of FIGS. 17a and 17b. Again, those skilled in the art will readily appreciate that many different actuating devices may be used in conjunction with the electromagnetic actuator as disclosed and described herein to activate the locking dog-clutch assembly of the present invention.

The actuator 200 basically comprises an electromagnetic ring 232 and a movable plate 218 adapted to be selectably drawn toward the ring 232 in response to an electromagnetic field generated thereby. A guide member 210 rigidly attaches to the end of the pinion shaft 107, as shown, or differential case 78 (not shown) and supports a shoe 208 which is linearly constrained to slide along the guide member 210. The actuating cable 152 is attached to one end of the shoe 208, as shown, using any one of a number of well-known attachment techniques, such as soldering, crimping or looped connection. Preferably the shoe 208 includes a tension adjustment mechanism (not shown) in order to adjust the tension exerted on the actuating cable 152. It will be understood that the entire assembly comprising the pinion shaft actuator assembly 148, guide member 210, cable 152 and shoe 208, rotates with the differential case 78.

The shoe 208 includes a base portion 212 slidably retained within the guide member 210, as shown, and a pair of runners 214, 226 slidably retained within corresponding circular grooves 216, 224 formed in the movable plate 218. The movable plate 218 is rotatably fixed with respect to the electromagnetic ring 232. When the ring 232 is energized the plate 218 is drawn toward the ring 232. This causes the shoe 208 also to be drawn toward the plate 218 creating a tensile force on the actuating cable 152, actuating the locking dog-clutch assembly substantially as described above in connection with FIGS. 17a,b.

The movable plate 218 is preferably a ring-shaped member formed of a steel or other ferrous material. The plate 218 has a generally flat outer rim portion 220, as shown, and a relatively thicker inner portion 222, which includes the circular grooves 216, 224. The movable plate 218 also includes a plurality of apertures 228 extending axially through the outer rim portion 220. Only one of the apertures 228 is shown in FIG. 17 for purposes of illustration. There are preferably at least three or more such apertures substantially evenly spaced around the periphery of the movable plate 218. The apertures 228 each receive pins 230 axially extending from the electromagnetic ring 232. Each pin 230 includes a small transversely oriented stop pin 234 fixed therein having a length sufficient to prevent the plate 218 from disengaging from the electromagnetic ring 232. Alternatively, any number of other retaining means well known in the art may be used to retain the plate 218 in a position adjacent to the electromagnetic ring 232, as shown.

A coiled return spring 238 is preferably provided between the electromagnetic ring 232 and the movable plate 218 in order to bias the movable plate 218 away from the electromagnetic ring 232. The spring 238 is preferably adapted to fully collapse upon itself so that its compressed length is minimal. The spring 230 preferably lies within an annular recess 236 formed in the plate 218. In a preferred embodiment, the plate 218 and ring 232 define a gap 235 of between about 0.125 to 0.150 inches when the ring is not energized, and a gap 235 of between about 0.0 to 0.030 inches when the ring 232 is energized.

The electromagnetic ring 232 comprises a rear ring plate 240 having an angled inner wall 242 extending outwardly toward the movable plate 218. The combination of the ring plate 240 and the angled wall 242 define an annular space within which an electromagnetic coil 244 is disposed, as shown. An outer annular cover 246 surrounds the coil 244 in order to limit dispersion of the electromagnetic field generated thereby. The magnetic field path around the coil is interrupted by a small annular gap 237 approximately 0.062 to 0.150 inches across, as shown. This gap 237 directs the magnetic field through the adjacent plate 218, thereby drawing it toward the ring 232 when it is energized.

In one particular preferred embodiment, the gauge of wire used for the coil 244 is designated 20H or 21H, and the coil 244 has approximately 220 turns around the ring 232. The mean turn length (MTL) is approximately 14 inches, the mean path length (MPL) is approximately 2 inches, and the mean surface area is approximately 8 square inches. The coil is adapted to be energized by a 12 VDC, 4-Amp input actuation signal applied across the coil 244 from the input terminal 48 to ground. This creates a maximum holding force of about 28 lbs with the gap between the electromagnetic ring 232 and movable plate 218 being about 0.030 inches. This holding force will decrease somewhat upon heating of the apparatus, but the present configuration facilitates closure of the gap 235 between the movable plate 218 and electromagnetic ring 232, as will be described in more detail below.

Those skilled in the art will appreciate that when the coil 244 is energized, a magnetic attraction occurs in the gap 235 between the movable plate 218 and the ring 232. The shoe 208 resists the movement of the plate 218 by virtue of its connection to the actuating rod 150 whose movement is resisted by the spring loaded balls 154. Because of the small space available within the differential housing, the size of the coil 244 is limited. In fact, the magnetic actuating force required to draw the plate 218 and the shoe 208 is larger than can be created by the coil 244, at least at the maximum gap distance existing between plates 218 and 232, as shown in FIG. 18a.

However, when the coil is energized the magnetic field created thereby will initially draw a portion of the plate 218 opposite the shoe 208, pulling that portion of the plate toward the ring 232, as shown in FIG. 18b. As that portion of the plate 218 opposite the shoe 208 approaches and eventually contacts the ring 232, the attraction force increases exponentially such that the edge of the plate proximate the initial contacting portion will also be attracted toward the ring 232 with increasing force. Ultimately, the portion of the plate in contact with the ring 232 will work its way around the periphery of the plate 218 in a cascading effect until the entire plate 218 is in contact with the ring 232, as shown in FIG. 18c. This will eventually pull the shoe 208 toward the ring 232, displacing the actuating rod 150 via the cable 152, and thereby actuating the locking dog-clutch assembly 90 as described above. To accommodate this mode of actuation, the holes 228 formed in the outer rim portion 220 of the plate 218 are preferably sized slightly larger than the pins 230 so that the plate 218 is capable of pivoting as shown in FIG. 18b.

Figure 19:
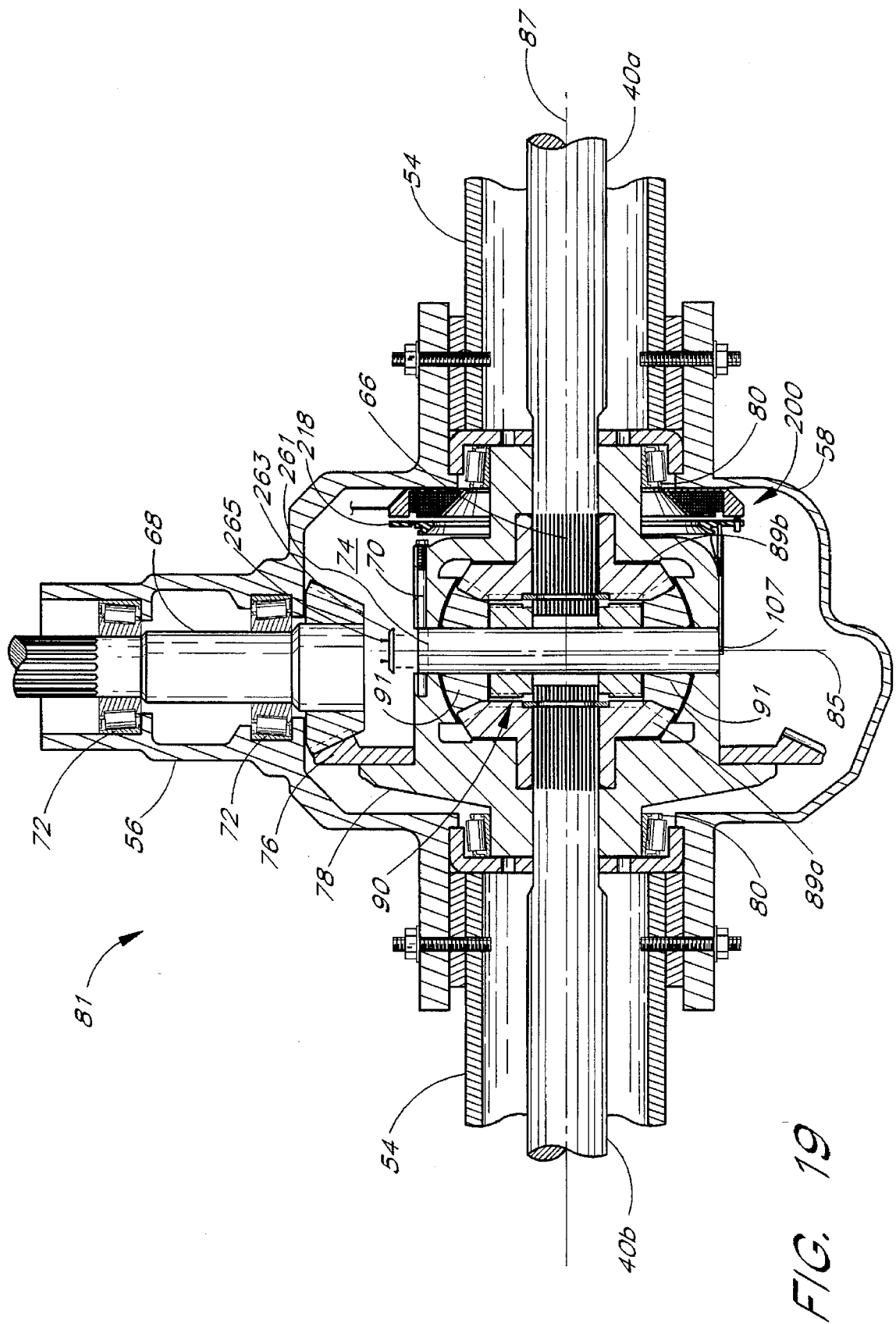
FIG. 19 is a cross-sectional view of a fully assembled locking differential gear assembly and electromagnetic actuator assembly having features in accordance with the present invention.

FIG. 19 is a cross-sectional view of a fully assembled locking differential and actuator assembly having features of the present invention. The electromagnetic actuator 200 is mounted coaxially with the differential case 78, as shown. For some differentials, such as C-clip differentials, the pinion shaft must be installed last. This can present an installation problem where a retainer pin 70 is required to secure the pinion shaft to the differential casing, since access may be prevented once the actuator 200 is installed. To accommodate final assembly of the pinion shaft 107 in such differentials, a slot 261 may be formed in one end of the pinion shaft 107 so as to allow it to be slipped over the assembled retainer pin 70. A retainer cap 263 can then be fastened via screws 265 to the end of the pinion shaft 107 in order to secure the pinion shaft in place. These screws 265 are readily accessed by rotating the differential case 90 degrees from the position illustrated.

Locking Differential Selector

The locking differential of the present invention is preferably selectable, as noted above, so as to enable an operator of a vehicle to selectably lock the axle shafts together by activating a remote actuator, preferably located within the vehicle cockpit or passenger compartment. Persons skilled in the art will readily appreciate that various means may be used for selectably actuating a locking differential having features of the present invention.

FIG. 20 illustrates one possible embodiment of a locking differential selector having features of the present invention. The illustrated embodiment includes a switch 44 and an indicator 49 connected between a vehicle battery 42 and an electromagnetic differential actuator, such as described above in connection with FIGS. 18a–c. The switch and indicator are preferably mounted on the dashboard of the vehicle such that they can be easily operated by the driver whenever added traction is desired. An optional fuse 46 is connected in series between the switch and battery 42, as shown, in order to limit the maximum current delivered to the system in the even of a short circuit.

An elongated conductor 48 extends from the switch 44 into the differential housing 52 where it connects to a portion of an electromagnetic differential actuator, such as the coil 244 shown in FIGS. 18a–c, the other end of the coil 244 being connected to ground. When the switch 44 is closed, current flows from the battery, though the conductor 48, energizing the coil 244, activating the locking differential. The indicator 49 is also energized indicating that the axles 40a,b are locked. Such selectability allows the present invention to be used in dual-use vehicles, such as, for example vehicles used for both street and off-highway use, without compromising either drivability or traction.

To connect the conductor 48 to an electrically operable actuator disposed within the differential housing 52, a hollow stud 50' is preferably provided through which the conductor 48 may pass. Threaded holes on either the front or rear side of the housing 52 may receive the stud 50'. The conducting wire 48 then extends through the hollow stud into the housing 52 and into communication with the coil 244. Optionally, the stud 50' may enclose an electrical coupling or other electrical interface in order to facilitate easier installation, as desired.

Advantageously, the hollow stud 50' can also be used for other types of differential actuators such as pneumatic, hydraulic, or mechanical actuators. For instance, a small pneumatic line can be introduced through the bore of the stud 50' into communication with a pneumatic actuator. Moreover, the hollow stud 50' allows introduction of an external actuation signal into the differential housing 52 without required drilling or other machining operations which may introduce undesirable debris into the sealed differential housing 52. Significant time and costs savings can also be realized, as no special tools or skills are needed to complete the installation.

Although this invention has been described in terms of certain preferred embodiments, other possible embodiments will be readily apparent to those of ordinary skill in the art. Accordingly, the scope of the invention disclosed herein is intended to be defined only by the claims that follow.

What is claimed is:

1. A locking differential kit adapted for assembly into a casing of a differential gear assembly disposed between a first drive axle shaft and a second drive axle shaft for converting said differential gear assembly into a locking differential gear assembly which can be selectably actuated to lock said first drive axle shaft to said second drive axle shaft, said locking differential kit comprising:

first and second differential side gears adapted to be angularly fixed with respect to each said first and second drive axle shafts, each said differential side gears having an inner face and an outer face, said inner face having a face spline formed thereon;

first and second interlocking members adapted to be installed on either side of a pinion shaft of said differential gear assembly, each said interlocking member having an inner face and an outer face, said outer face having formed thereon a corresponding face spline adapted to engage said face spline formed on the inner face of each said differential side gear, such that when said locking differential kit is assembled into said vehicular differential gear assembly casing, said interlocking members can be moved into selective engagement with said first and second differential side gears so as to prevent substantial rotational differentiation thereof; a remotely activated actuator comprising a mechanical, hydraulic or pneumatic transducer for causing said interlocking member to engage said differential side gears whereby a selectable locking differential is achieved.

2. The locking differential kit of claim 1 wherein each said face spline comprises an interlocking pattern of teeth.

3. The locking differential kit of claim 2 wherein each said face spline comprises a substantially uniform pattern of radially formed teeth having a pressure angle of between about 0 and 20 degrees.

4. The locking differential kit of claim 3 wherein each said face spline comprises radially formed teeth having a pressure angle of between about 5–7 degrees.

5. The locking differential kit of claim 1 wherein each said interlocking member is substantially interchangeable with one another and comprises at least one male engagement member and at least one female engagement member adapted to engage one another so as to prevent significant relative rotational movement of said interlocking members when assembled.

6. The locking differential kit of claim 5 wherein each said female engagement member has a contoured cam surface adapted to engage said male engagement member and urge said interlocking members apart in response to relative angular rotation therebetween.

7. The locking differential kit of claim 6 wherein said contoured cam surface is helical over a rotation of about 5.25 degrees.

8. The locking differential kit of claim 1 wherein each said interlocking member comprises a channel or recess adapted to accommodate said pinion shaft.

9. The locking differential kit of claim 1 further comprising one or more differential pinion gears operable between said first and second differential side gears for allowing rotational differentiation of said differential side gears and said first and second drive axle shafts when said interlocking members are not engaged with said differential side gears.

10. The locking differential kit of claim 1 wherein said actuator further comprises an electromagnetic transducer.

11. A locking differential assembly for selectably locking a first drive axle shaft to a second drive axle shaft, said locking differential assembly comprising:

first and second differential side gears having teeth and adapted to be angularly fixed with respect to said first and second drive axle shafts;

one or more differential pinion gears rotatably mounted on a pinion shaft and operable between said first and second differential side gears for allowing rotational differentiation of said differential side gears;

a locking mechanism for selectably locking said first and second differential side gears relative to one another, said locking mechanism comprising first and second interlocking members adapted to be installed on either side of said pinion shaft, each said interlocking member having an inner face and an outer face, said outer face having formed thereon a face spline adapted to engage a corresponding face spline formed on an inner face of each said first and second differential side gears, said interlocking members being adapted to be moved into selective engagement with said first and second differential side gears for substantially preventing rotational differentiation of said differential side gears.

12. The locking differential assembly of claim 11 wherein each said interlocking member comprises at least one male engagement member and at least one female engagement member adapted to engage one another so as to substantially prevent relative rotational movement of said interlocking members when assembled in said locking differential assembly.

13. A locking mechanism for selectably locking a first differential side gear to a second differential side gear of a differential gear assembly, said locking mechanism comprising a pair of interlocking members adapted to be installed on either side of a pinion shaft of said differential gear assembly, each said interlocking member being substantially interchangeable with the other and comprising at least one male engagement member and at least one female engagement member adapted to engage one another so as to prevent significant relative rotational movement of said interlocking members, each said interlocking member further having formed on an outer face thereof a face spline adapted to selectably engage a corresponding mating face spline formed on an inner face of each said first and second differential side gears, such that said interlocking members can be moved into selective engagement with said first and second differential side gears so as to prevent substantial rotational differentiation thereof.

14. The locking mechanism of claim 13 wherein each said face spline comprises an interlocking pattern of teeth.

15. The locking mechanism of claim 14 wherein each said face spline comprises a substantially uniform pattern of radially formed teeth having a pressure angle of between about 0 and 20 degrees.

16. The locking mechanism of claim 15 wherein each said face spline comprises radially formed teeth having a pressure angle of about 5–7 degrees.

17. The locking mechanism of claim 13 wherein each said female engagement member has a contoured cam surface adapted to engage said male engagement member and urge said interlocking members apart in response to relative angular rotation therebetween.

18. The locking mechanism of claim 17 wherein said contoured cam surface is helical over a rotation of about 5.25 degrees.

19. The locking mechanism of claim 13 wherein each said interlocking member comprises a channel or recess adapted to accommodate said pinion shaft.

20. A locking differential kit adapted for assembly into an existing vehicular differential for converting an ordinary differential gear assembly into a locking differential gear assembly which can be selectably actuated to lock a first drive axle shaft to a second drive axle shaft, said locking differential kit comprising:

first and second interlocking clutch members adapted to be installed on either side of a pinion shaft of said differential gear assembly, each said interlocking clutch members comprising engagement means for selectably engaging a pair of differential side gears so as to prevent substantial rotational differentiation thereof;

an actuator member responsive to a mechanical, hydraulic or pneumatic actuation signal for causing said clutch members to engage said differential side gears; and a threaded member for securing a housing cover to a vehicular differential housing, said threaded member having a passageway formed therein for allowing transmission of said actuation signal to said actuator member;

whereby a selectably actuated locking vehicular differential is achieved.

21. The locking differential kit of claim 20 wherein said engagement means comprises a face spline formed on an outer face of each said interlocking clutch members adapted to matingly engage a corresponding facing spline formed on an inner face of each said first and second differential side gears.

22. The locking differential kit of claim 21 wherein said face spline comprises radially formed teeth having a pressure angle of about 7 degrees.

23. The locking differential kit of claim 20 wherein said actuator member is responsive to an electrical actuation signal.

24. The locking differential kit of claim 20 wherein said threaded member comprises a hollow threaded stud having a passageway formed axially therethrough for accommodating a conductor for transmitting said actuation signal to said actuator member.

* * * * *